US012693512B2

(12) United States Patent
Liao et al.

(10) Patent No.: US 12,693,512 B2
(45) Date of Patent: *Jul. 28, 2026

(54) MICROSCOPE-BASED SYSTEM AND METHOD FOR IMAGE-GUIDED MICROSCOPIC ILLUMINATION

(71) Applicant: Academia Sinica, Taipei (TW)

(72) Inventors: Jung-Chi Liao, Taipei City (TW); Yi-De Chen, Taipei (TW); Chih-Wei Chang, Taipei (TW); Weng Man Chong, Taipei City (TW)

(73) Assignee: Academia Sinica, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,298

(22) Filed: Oct. 8, 2024

(65) Prior Publication Data

US 2025/0028162 A1     Jan. 23, 2025

Related U.S. Application Data

(63) Continuation of application No. 18/464,125, filed on Sep. 8, 2023, now Pat. No. 12,366,742, which is a
(Continued)

(51) Int. Cl.
G02B 21/36        (2006.01)
G02B 21/06        (2006.01)
(Continued)

(52) U.S. Cl.
CPC ........... G02B 21/365 (2013.01); G02B 21/06 (2013.01); G02B 21/26 (2013.01); G06V 10/141 (2022.01);
(Continued)

(58) Field of Classification Search
None
See application file for complete search history.

(56) References Cited

U.S. PATENT DOCUMENTS 5,646,413 A     7/1997  Nishi
6,522,774 B1    2/2003  Bacus et al.
(Continued)

FOREIGN PATENT DOCUMENTS

TW          201013817 A      4/2010
WO      WO2016/133787 A1     8/2016

OTHER PUBLICATIONS

Alqattan et al.; Direct laser writing of nanophotonic structures on contact lenses; ACS nano; 12(6); pp. 5130-5140; Apr. 2018.
(Continued)

*Primary Examiner* — Rebecca A Volentine
(74) *Attorney, Agent, or Firm* — Shay Glenn LLP

(57)     ABSTRACT

A system and method for image-guided microscopic illumination are provided. A processing module controls an imaging assembly such that a camera acquires an image or images of a sample in multiple fields of view, and the image or images are automatically transmitted to a processing module and processed by the first processing module automatically in real-time based on a predefined criterion so as to determine coordinate information of an interested region in each field of view. The processing module also controls an illuminating assembly to illuminate the interested region of the sample according to the received coordinate information regarding to the interested region, with the illumination patterns changing among the fields of view.

20 Claims, 12 Drawing Sheets

Related U.S. Application Data continuation of application No. 17/592,211, filed on Feb. 3, 2022, now Pat. No. 11,789,251, which is a continuation of application No. 16/013,663, filed on Jun. 20, 2018, now Pat. No. 11,265,449.

(60) Provisional application No. 62/522,265, filed on Jun. 20, 2017.

(51) Int. Cl.

| | |
|---|---|
| *G02B 21/26* | (2006.01) |
| *G06V 10/141* | (2022.01) |
| *G06V 10/25* | (2022.01) |
| *G06V 20/69* | (2022.01) |
| *H04N 23/56* | (2023.01) |
| *H04N 23/74* | (2023.01) |

(52) U.S. Cl.
CPC ............ *G06V 10/25* (2022.01); *G06V 20/693* (2022.01); *H04N 23/56* (2023.01); *H04N 23/74* (2023.01)

(56) References Cited

U.S. PATENT DOCUMENTS

| | | | |
|---|---|---|---|
| 6,614,031 | B2 | 9/2003 | Engelhardt et al. |
| 6,697,526 | B1 | 2/2004 | Abe |
| 6,947,583 | B2 | 9/2005 | Ellis et al. |
| 6,956,647 | B2 | 10/2005 | Foster et al. |
| 7,133,543 | B2 | 11/2006 | Verwoerd et al. |
| 7,460,732 | B2 | 12/2008 | Recht |
| 7,639,357 | B2 | 12/2009 | Okugawa |
| 7,817,273 | B2 | 10/2010 | Bahatt et al. |
| 8,187,866 | B2 | 5/2012 | Duer |
| 8,288,157 | B2 | 10/2012 | Duer |
| 8,923,568 | B2 | 12/2014 | Olson et al. |
| 9,019,598 | B2 | 4/2015 | Tsurumune |
| 9,030,547 | B2 | 5/2015 | Vizi et al. |
| 9,125,562 | B2 | 9/2015 | Spencer et al. |
| 9,217,694 | B2 | 12/2015 | Sieckmann et al. |
| 9,528,939 | B2 | 12/2016 | Duer |
| 9,557,156 | B2 | 1/2017 | Kankaria |
| 9,581,801 | B2 | 2/2017 | Takamizawa |
| 9,696,535 | B2 | 7/2017 | Prakash et al. |
| 9,788,790 | B2 | 10/2017 | Black et al. |
| 9,810,892 | B2 | 11/2017 | Prakash et al. |
| 9,939,381 | B1 | 4/2018 | Kimmel et al. |
| 10,517,482 | B2 | 12/2019 | Sato et al. |
| 10,729,326 | B2 | 8/2020 | Spencer et al. |
| 10,746,980 | B2 | 8/2020 | Kenny et al. |
| 10,932,670 | B2 | 3/2021 | Smith et al. |
| 11,265,449 | B2 | 3/2022 | Liao et al. |
| 11,408,821 | B2 | 8/2022 | Boamfa et al. |
| 11,513,328 | B2 | 11/2022 | Pannhoff et al. |
| 11,789,251 | B2 | 10/2023 | Liao et al. |
| 2002/0008904 | A1 | 1/2002 | Engelhardt |
| 2003/0189676 | A1 | 10/2003 | Kato et al. |
| 2003/0231791 | A1 | 12/2003 | Torre-Bueno et al. |
| 2004/0105000 | A1 | 6/2004 | Yuri |
| 2005/0072920 | A1 | 4/2005 | Inada |
| 2005/0082494 | A1 | 4/2005 | Motomura |
| 2005/0089208 | A1 | 4/2005 | Dong et al. |
| 2005/0179899 | A1 | 8/2005 | Wasserman et al. |
| 2006/0028717 | A1 | 2/2006 | Dunn |
| 2006/0226375 | A1 | 10/2006 | Maruo |
| 2007/0152130 | A1 | 7/2007 | Fomitchov |
| 2008/0206752 | A1 | 8/2008 | Balakirev et al. |
| 2009/0195646 | A1 | 8/2009 | Ganser et al. |
| 2009/0316259 | A1 | 12/2009 | Kenny et al. |
| 2010/0079857 | A1 | 4/2010 | Sasaki et al. |
| 2010/0278399 | A1 | 11/2010 | Bednarkiewicz et al. |
| 2011/0050745 | A1 | 3/2011 | Jung et al. |
| 2012/0242817 | A1 | 9/2012 | Pan |
| 2013/0250391 | A1* | 9/2013 | Kato .................... G02B 21/367 |
| | | | 359/238 |
| 2013/0294645 | A1 | 11/2013 | Sibarita |
| 2014/0022373 | A1 | 1/2014 | Kanarowski et al. |
| 2014/0152794 | A1 | 6/2014 | Takahashi |
| 2014/0293407 | A1 | 10/2014 | Amano et al. |
| 2015/0168702 | A1 | 6/2015 | Harris |
| 2015/0185456 | A1 | 7/2015 | Kishima |
| 2015/0258352 | A1 | 9/2015 | Lin et al. |
| 2016/0124208 | A1 | 5/2016 | Best et al. |
| 2016/0302740 | A1 | 10/2016 | Iyer et al. |
| 2017/0059407 | A1 | 3/2017 | Shiraiwa |
| 2017/0090176 | A1 | 3/2017 | Pospiech et al. |
| 2017/0154236 | A1 | 6/2017 | Masuura et al. |
| 2017/0212342 | A1 | 7/2017 | Rozsa et al. |
| 2017/0248837 | A1 | 8/2017 | Sato et al. |
| 2017/0299784 | A1 | 10/2017 | Mikkelsen et al. |
| 2018/0136451 | A1 | 5/2018 | Soenksen |
| 2018/0177401 | A1 | 6/2018 | Yang et al. |
| 2018/0180642 | A1 | 6/2018 | Shetty et al. |
| 2018/0180885 | A1 | 6/2018 | Holland et al. |
| 2018/0203221 | A1 | 7/2018 | Dai et al. |
| 2018/0210183 | A1 | 7/2018 | Nishikawa |
| 2018/0284419 | A1 | 10/2018 | Peschka et al. |
| 2018/0348500 | A1 | 12/2018 | Naaman et al. |
| 2019/0324240 | A1 | 10/2019 | Shroff et al. |
| 2019/0339456 | A1 | 11/2019 | Ruggles |
| 2019/0391078 | A1 | 12/2019 | Cohen et al. |
| 2021/0224954 | A1 | 7/2021 | Guo et al. |
| 2023/0418041 | A1 | 12/2023 | Liao et al. |
| 2024/0219703 | A1 | 7/2024 | Liao et al. |
| 2024/0219704 | A1 | 7/2024 | Liao et al. |
| 2024/0219705 | A1 | 7/2024 | Liao et al. |
| 2024/0411122 | A1 | 12/2024 | Liao et al. |
| 2025/0035910 | A1 | 1/2025 | Liao et al. |
| 2025/0052993 | A1 | 2/2025 | Liao et al. |

OTHER PUBLICATIONS

Aznar et al.; Gated materials for on-command release of guest molecules; Chemical reviews; 116(2); pp. 561-718; Jan. 27, 2016.

Bar et al.; Biotinylation by antibody recognition—a method for proximity labeling; Nature Methods; 15(2); pp. 127-133; (author Manuscript); 19 pages; Feb. 2018.

Brieke et al.; Light?controlled tools; Angewandte Chemie International Edition; 51(34); pp. 8446-8476; Aug. 20, 2012.

Chen et al.; Lattice light-sheet microscopy: imaging molecules to embryos at high spatiotemporal resolution; Science; 346(6208); 1257998; doi:10.1126/scince.1257998; (Author Manuscript); 28 pages; Oct. 2014.

Ezzoukhry et al.; Combining laser capture microdissection and proteomics reveals an active translation machinery controlling formation; Nature Communications; 9(1); doi:10.1038/s41467-018-04461-9; 11 pages; May 2018.

Hadley et al.; Determining composition of micron-scale protein deposits in neurodegenerative disease by spatially targeted optical microproteomics; eLife; 21 pages. doi: 10.7554/eLife.09579; Sep. 2015.

Hirsch et al.; Easily reversible desthiobiotin binding to streptavidin, avidin, and other bitin-binding proteins: uses for protein labeling, detection, and isolation; Analytical Biochemistry; 308(2); pp. 343-357; Sep. 2002.

Hung et al.; Protein localization in disease and therapy; Journal of Cell Science; 124(20); pp. 3381-3392; Oct. 2011.

Hung et al.; Spatially resolved proteomic mapping in living cells with the engineered peroxidase APEX2; Nature Protocols; 11(3); pp. 456-475; (Author Manuscript); 39 pages; Mar. 2016.

Itzhak et al.; A mass spectrometry-based approach for mapping protein neurons; Cell Reports; 20(11); pp. 2706-2718; Sep. 2017.

Jain et al.; ATPase-modulated stress granules contain a diverse proteome and substructure; Cell; 164(3); pp. 487-498; Jan. 2016.

Kamburov et al.; The consensusPathDB interaction database: 2013 update; Nucleic Acids Research; 41(D1); pp. D793-D800; Jan. 2013.

Kepiro et al.; Molecular tattoo: subcellular confinement of drug effects; Chemistry and Biology; 22(4); pp. 548-558; Apr. 2015.

(56) References Cited

OTHER PUBLICATIONS

Lam et al.; Directed evolution of APEX2 for electron microscopy and proximity labeling; Nature Methods; 12(1); pp. 51-54; (author Manuscript); 15 pages; Jan. 2015.

Liao et al.; A pioneering high content cell image-registered protein labeling system; 2017 Bio Taiwan Exhibition and Conference; 2 pages; Jun. 29-Jul. 2, 2017.

Liao et al.; High content cell image-registered protein labeling system; 2017 Bio Taiwan Exhibition and Conference; 14 pages; Jun. 29-Jul. 2, 2017.

Liu et al; Supplementary materials: super-resolution labeling with action-paint; Nature Chemistry; Supplementary Information; doi. org/10.1038/s41557-019-0325-7; 43 pages retrieved from the internet (https://yin.hms.harvard.edu/publications/2019.alp.sup.pdf); on Nov. 8, 2022.

Prier et. al.; Visible light photoredox cataysis with transition metal complexes: applications in organic synthesis; Chemical reviews; 113(7); pp. 5322-5363; (author Manuscript) 141 pages; Jul. 2013.

Rhee et al.; Proteomic mapping of mitochondria in living cells via spatially restricted enzymatic tagging; Science; 339(6125); pp. 1328-1331; (Author Manuscript); 8 pages; Mar. 2013.

Rost et al.; Multiplexed ion beam imaging analysis for quanitation of protein expression in cancer tissue sections; Laboratory Investigation; 97(8); pp. 992-1003; Aug. 2017.

Roux et al.; A promiscuous biotin ligase fusion protein identifies proximal and interacting proteins in mammalian cells; Journal of Cell Biology; 196(6); pp. 801-810; Mar. 2012.

Roux et al.; BioID: A screen for protein-protein interactions: Current Protocols in protein Science; 91(1); pp. 19-23; (Author Manuscript); 20 pages; Jan. 2018.

Thermofisher Scientific: Sulfo-SBED biotin label transfer reagent; (Product Discription); retrieved from the internet (https://www. thermofisher.com/order/catalog/product/33033#/33033); 5 pages; on May 5, 2021.

Thul et al.; A subcellular map of the human proteome; Science; 356(6340) eaal3321; 14 pages; May 2017.

Zipfel et al.; Nonlinear magic: multiphoton microscopy in the biosciences; Nature Biotechnolgy: 21(11); pp. 1369-1377; Nov. 2003.

Huang et al.; U.S. Appl. No. 18/748,710 entitled "Adjustable Support and Optical Module," filed Jun. 20, 2024.

Liao et al.; U.S. Appl. No. 18/909,323 entitled "Microscope-based system and method for image-guided microscope illumination," filed Oct. 8, 2024.

Ronneberger et al.; U-net: Convolutional networks for biomedical image segmentation. InMedical image computing and computer-assisted interventionRMICCAI 2015; 18th international conference; Springer international publishing; pp. 234-241; 2015 (the year of publication is sufficiently earlier than the effective U.S. filing date and any foreign priority date so that the particular month of publication is not in issue).

Stegmaier et al.; Real-time three-dimensional cell segmentation in large-scale microscopy data of developing embryos. Developmental Cell; 36(2); pp. 225-240; Jan. 25, 2016.

Wikipedia; Biotinylation; 4 pages; retrieved from the internet (https:// en.wikipedia.org/w/index.php?title=Biotinylation&oldid= 841539236) on May 16, 2018.

Liao et al.; U.S. Appl. No. 18/864,988 entitled "Method of calibrating a microscope system," filed Nov. 12, 2024.

Liao et al.; U.S. Appl. No. 18/864,997 entitled "Method of calibrating a microscope system," filed Nov. 12, 2024.

Chen et al.; U.S. Appl. No. 18/877,609 entitled "Microscope-based system and method using a UV-transmission mirror," filed Dec. 20, 2024.

Liao et al.; U.S. Appl. No. 18/997,408 entitled "Training AI model for a microscope-based pattern photoillumination system," filed Jan. 21, 2025.

Liao et al.; U.S. Appl. No. 18/997,412 entitled "Method of standardizing image pixel values in a microscope-based system," filed Jan. 21, 2025.

Liao et al.; U.S. Appl. No. 19/110,325 entitled "Microscope-based system and method of determining beam processing path," filed Mar. 10, 2025.

* cited by examiner

MICROSCOPE-BASED SYSTEM AND METHOD FOR IMAGE-GUIDED MICROSCOPIC ILLUMINATION

CROSS REFERENCE OF RELATED APPLICATIONS

This is a continuation of U.S. application Ser. No. 18/464,125, filed Sep. 8, 2023, which is a continuation of U.S. application Ser. No. 17/592,211, filed Feb. 3, 2022, now U.S. Pat. No. 11,789,251, which is a continuation of U.S. application Ser. No. 16/013,663, filed Jun. 20, 2018, now U.S. Pat. No. 11,265,449, which claims the benefit of priority to U.S. Provisional Application No. 62/522,265, filed Jun. 20, 2017. These and all other extrinsic materials discussed herein are hereby incorporated by reference in their entirety.

BACKGROUND

Technical Field

The present invention relates to a system and method for illuminating patterns on a sample, especially relating to a microscope-based system and method for illuminating varying patterns through a large number of fields of view consecutively at a high speed.

Related Arts

There are needs in illuminating patterns on samples (e.g., biological samples) at specific locations. Processes such as photobleaching of molecules at certain subcellular areas, photoactivation of fluorophores at a confined location, optogenetics, light-triggered release of reactive oxygen species within a designated organelle, or photoinduced labeling of proteins in a defined structure feature of a cell all require pattern illumination. For certain applications, the pattern of the abovementioned processes may need to be determined by a microscopic image. Some applications further need to process sufficient samples, adding the high-content requirement to repeat the processes in multiple regions. Systems capable of performing such automated image-based localized photo-triggered processes are rare.

One example of processing proteins, lipids, or nucleic acids is to label them for isolation and identification. The labeled proteins, lipids, or nucleic acids can be isolated and identified using other systems such as a mass spectrometer or a sequencer. STOMP (spatially targeted optical micro-proteomics) technique proposed by Kevin C Hadley et al. in 2015 is a technique that is operated manually using a commercially available two-photon system, lacking the main elements to reach the high-content capability of this invention. The laser capture microdissection (LCM) system widely used to isolate a part of tissues or cell cultures using laser cutting does not have axial precision that this invention can achieve in addition to the lack of high-content capability.

SUMMARY

In view of the foregoing objectives, the invention provides image-guided systems and methods to enable illuminating varying patterns on the sample. In other words, such systems and methods have abilities to process a high content of proteins, lipids, nucleic acids, or biochemical species for regulation, conversion, isolation, or identification in an area of interest based on user-defined microscopic image features, widely useful for cell or tissue sample experiments. With a unique integration of optical, photochemical, image processing, and mechatronic designs, we are able to achieve image-guided illumination at a speed of 300 milliseconds per field of view, not accomplished by existing techniques such as STOMP or LCM. This speed is necessary to collect enough biomolecular samples in a reasonable duration. For example, we are able to collect enough protein samples for proteomic analysis with 10 hours of illumination. A distinct design strategy differentiates this invention from any existing techniques.

The system may comprise a microscope, an imaging light source, a digital camera, a first processing module, a second processing module such as field-programmable gate array (FPGA) or application-specific integrated circuit (ASIC), an illumination light source, a shutter, a pattern illumination device such as a pair of galvanometer scanning mirrors, a digital micromirror device (DMD), or a spatial light modulator (SLM), a microscope stage, and an autofocus device. A processing module is programmed to grab a camera image and to process the image on board in real-time based on user-defined criteria to determine the locations of the sample to illuminate. It is then programmed to control a shutter and scanning mirrors to direct an illumination light source to these locations one point at a time. The integrated memory unit (e.g., DRAM), when available, provides the data storage space essential for fast processing and transfer of image data to enable a rapid process. One processing module (e.g., a computer) controls an imaging light source, an autofocus device, and a microscope stage for imaging, focus maintenance, and changes of fields of view, respectively. Imaging, image processing, illumination, and stage movement are coordinated by the program to achieve rapid high content image-guided illumination. A femtosecond laser may be used as the illumination light source to generate a two-photon effect for high axial illumination precision. The image processing criteria may be the morphology, intensity, contrast, or specific features of a microscope image. Image processing is done with image processing techniques such as thresholding, erosion, filtering, or artificial intelligence trained semantic segmentation methods. The speed and the high content nature of the device may enable collection of a large amount of location-specific samples for photo-induced molecular tagging, photoconversion, or studies of proteomics, transcriptomics, and metabolomics.

To achieve the above objective, the present disclosure provides a microscope-based system for image-guided microscopic illumination. The microscope-based system for image-guided microscopic illumination comprises a microscope, an illuminating assembly, an imaging assembly, and a processing module. The microscope comprises a stage, and the stage is configured to be loaded with a sample. The imaging assembly may comprise a controllable camera, and the controllable camera can be mounted on the microscope or aligned with the optical path of the microscope. The illumination assembly may comprise a pattern illumination device. The processing module is coupled to the microscope, the imaging assembly, and the illuminating assembly. The processing module controls the imaging assembly such that the camera acquires at least one image of the sample of a first field of view, and the image or images are transmitted to the processing module and processed by the processing module automatically in real-time based on a predefined criterion, so as to determine an interested region in the image and so as to obtain a coordinate information regarding to the interested region, and the coordinate information regarding to the interested region is automatically transmitted to the processing module, where the processing module controls the pattern illumination device of the illuminating assembly to illuminate the interested region of the sample according to the received coordinate information regarding to the interested region.

To achieve the above objective, the present disclosure also provides another microscope-based system for image-guided microscopic illumination. The microscope-based system for image-guided microscopic illumination comprises a microscope, an illuminating assembly, an imaging assembly, a first processing module, and a second processing module. The microscope comprises a stage, and the stage is configured to be loaded with a sample. The imaging assembly may comprise a controllable camera, and the controllable camera can be mounted on the microscope or aligned with the optical path of the microscope. The illumination assembly may comprise a pattern illumination device. The first processing module is coupled to the microscope and the imaging assembly. The second processing module is coupled to the illuminating assembly and the first processing module. The first processing module controls the imaging assembly such that the camera acquires at least one image of the sample of a first field of view, and the image or images are transmitted to the first processing module and processed by the first processing module automatically in real-time based on a predefined criterion, so as to determine an interested region in the image and so as to obtain a coordinate information regarding to the interested region, and the coordinate information regarding to the interested region is automatically transmitted to the second processing module, where the second processing module controls the pattern illumination device of the illuminating assembly to illuminate the interested region of the sample according to the received coordinate information regarding to the interested region.

To achieve the above objective, the present disclosure further provides still another microscope-based system. The microscope-based system for image-guided microscopic illumination comprises a microscope, an illuminating assembly, a first processing module, and a second processing module. The microscope comprises a stage, and the stage is configured to be loaded with a sample. The imaging assembly may comprise a controllable camera, and the controllable camera can be mounted on the microscope or aligned with the optical path of the microscope. The illumination assembly may comprise a pattern illumination device. The first processing module is coupled to the microscope and the imaging assembly. The second processing module is coupled to the illuminating assembly, the camera and the first processing module, and the second processing module comprises a memory unit. The first processing module controls the imaging assembly and the second processing module controls the camera such that the camera acquires at least one image of the sample of a first field of view, and the image or images are transmitted to the memory unit to the second processing module. The image or images are then processed by the second processing module automatically in real-time based on a predefined criterion, so as to determine an interested region in the image and so as to obtain a coordinate information regarding to the interested region, and the second processing module controls the pattern illumination device of the illuminating assembly to illuminate the interested region of the sample according to the received coordinate information regarding to the interested region.

To achieve the above objective, the present disclosure also provides another microscope-based method for image-guided microscopic illumination. The microscope-based method comprises the following steps through (a) to (d): (a) triggering a camera of a imaging assembly by a processing module to acquire at least one image of a sample of a first field of view, wherein the sample is loaded on a stage of a microscope; (b) automatically transmitting the image or images of the sample to the processing module; (c) based on a predefined criterion, performing image processing of the sample automatically in real-time by the processing module to determine an interested region in the image and obtain a coordinate information regarding to the interested region; and (d) controlling an illumination assembly by the processing module according to the obtained coordinate information to illuminate the interested region in the sample.

To achieve the above objective, the present disclosure further provides a microscope-based method for image-guided microscopic illumination. The microscope-based method comprises the following steps through (a) to (e): (a) triggering a camera of a imaging assembly by a first processing module to acquire at least one image of a sample of a first field of view, wherein the sample is loaded on a stage of a microscope; (b) automatically transmitting the image or images of the sample to the first processing module; (c) based on a predefined criterion, performing image processing of the sample automatically in real-time by the first processing module to determine an interested region in the image and obtain a coordinate information regarding to the interested region; (d) automatically transmitting the coordinate information regarding to the interested region to a second processing module; (e) controlling an illumination assembly by the second processing module according to the received coordinate information to illuminate the interested region in the sample.

To achieve the above objective, the present disclosure also provides another microscope-based method for image-guided microscopic illumination. The microscope-based method comprises the following steps through (a) to (d): (a) controlling an imaging assembly by a first processing module and triggering a camera of the imaging assembly by a second processing module to acquire at least one image of a sample of a first field of view, wherein the sample is loaded on a stage of a microscope; (b) automatically transmitting the image or images of the sample to a memory unit of the second processing unit; (c) based on a predefined criterion, performing image processing of the sample automatically in real-time by the second processing module to determine an interested region in the image and to obtain a coordinate information regarding to the interested region; and (d) controlling an illuminating assembly by the second processing module to illuminate the interested region in the sample according to the received coordinate information.

In one embodiment, after the interested region is fully illuminated, the first processing module controls the stage of the microscope to move to a second field of view which is subsequent to the first field of view.

In one embodiment, after moving to the subsequent field of view, the method further repeating the imaging process(es), the image processing process(es), and the illumination process(es) successively, until interested regions of all designated fields of view are illuminated.

In one embodiment, the image processing is done with real-time image processing techniques such as thresholding, erosion, filtering, or artificial intelligence trained semantic segmentation methods.

In one embodiment, the imaging assembly comprises an imaging light source, a first shutter, and the controllable camera. The imaging light source provides an imaging light through an imaging light path to illuminate the sample. The first shutter, along the imaging light path, is disposed between the image light source and the microscope. The controllable camera is disposed on the microscope or on the imaging light path.

In one embodiment, the illuminating assembly comprises an illuminating light source and the pattern illumination device. The illuminating light source provides an illuminating light through an illuminating light path to illuminate the sample. The pattern illumination device comprises at least a pair of scanning mirrors and a second shutter, a digital micromirror device, or a spatial light modulator, which, along the illuminating light path, is disposed between the illumination light source and the microscope.

To use the system and method of this disclosure, a cell or tissue sample can be prepared with photosensitizers and chemical agents in the media. At one field of view, a microscopic image is taken. An image processing program is then applied to the captured image to determine where the sample (such as proteins, lipids, nucleic acids, or other biochemical species) would be illuminated (e.g., photo-activated or processed by photochemical reaction using a two-photon illumination light source). The computer then transfers the coordinates of points of interest to scanners for localized illumination. For example, when the scenario is that where a photochemical reaction is required, the photo-sensitizers which are already applied in the area of interest may be excited by the excitation energy provided by the illumination light and trigger the chemical agents to process proteins, lipids, nucleic acids, or biochemical species in the illumination area. The microscope stage is then controlled to move to the next field of view again and again to repeat this image-guided photoconversion process until enough samples are processed.

The high-content capability of the system and method may be achieved and facilitated by optimal choices of scanners, shuttering devices, imaging approach, and optimal designs of real-time image processing and control of a pattern illumination device, a microscopic stage and shuttering devices. Chips such as programmable or customized electronics using FPGA or ASIC may be used for system optimization. This integration of software, firmware, hardware, and optics enables the high-content capability that differentiates this invention from other related techniques.

Accordingly, the present disclosure provides a microscope-based system and method for image-guided microscopic illumination. The microscope-based system and method utilizes two independent processing modules (i.e., the first processing module and the second processing module) which simultaneously controls the imaging assembly for taking at least one image of a sample and the illuminating assembly for illuminating the sample. Moreover, the second processing module is in communication with the first processing module and receives the coordination of the targeted points on the sample (i.e., the "interested region" in the image of the sample and processed by the first processing module) so as to rapidly control the illuminating assembly to illuminate targeted points on the sample. Hence, the image-guided systems and methods of this disclosure enable a high-content process to illuminate varying patterns through a large number of fields of view consecutively.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

Figure 1A:
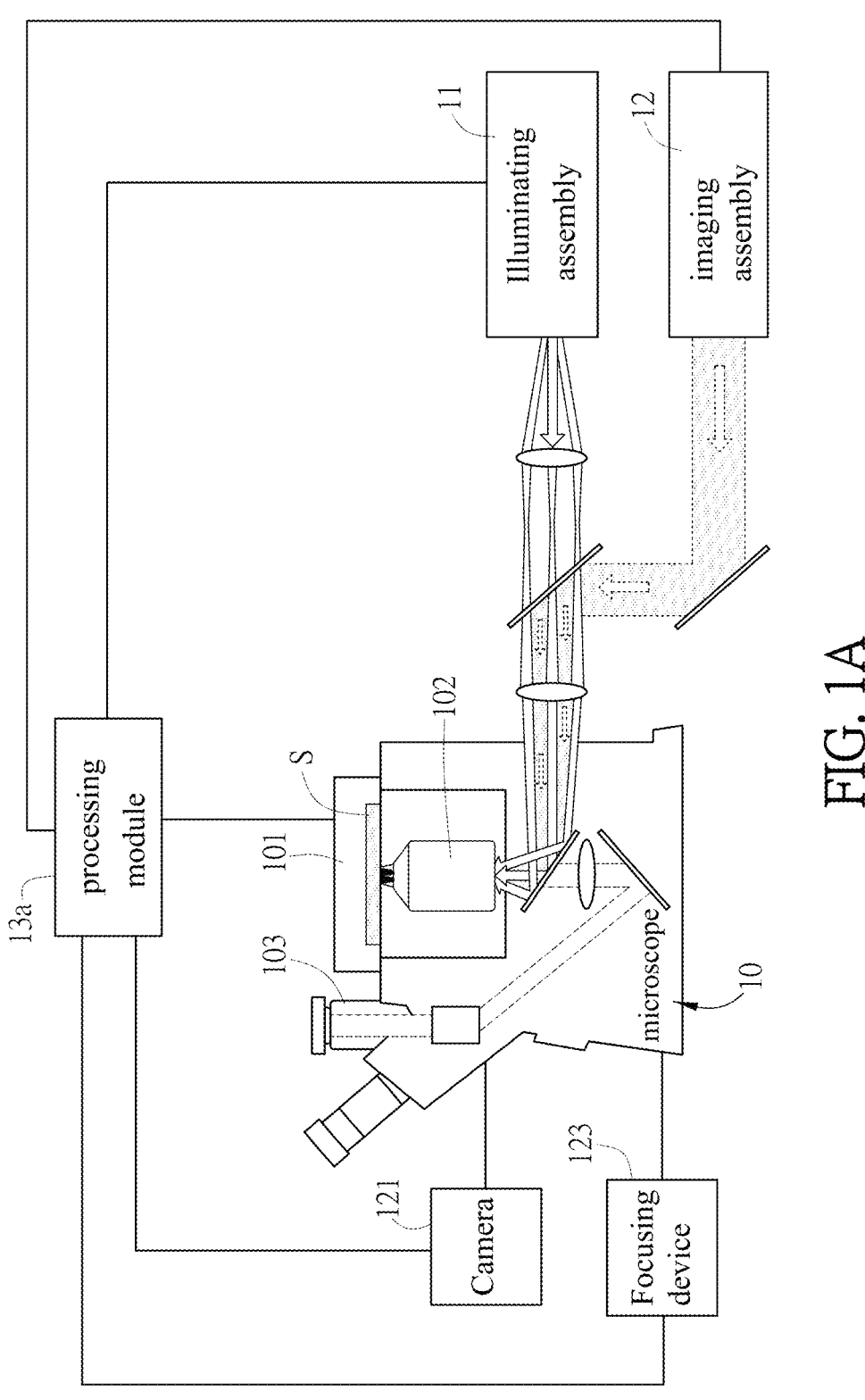
FIG. 1A represents a schematic diagram of an imaging-guided system according to one embodiment of the present disclosure.

The embodiments of the invention will be apparent from the following detailed description, which proceeds with reference to the accompanying drawings, wherein the same references relate to the same elements.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

It is to be noted that all directional indications (such as up, down, left, right, front, rear and the like) in the embodiments of the present disclosure are only used for explaining the relative positional relationship, circumstances during its operation, and the like, between the various components in a certain specific posture (as shown in the accompanying drawings). If the specific posture changes, the directional indication will also change accordingly.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The system and method provide by the various embodiments of this present disclosure may relates to for processing, for example but not limited thereto, a high content of proteins, lipids, nucleic acids, or biochemical species comprising an imaging light source, a photosensitizing light source, a pattern illumination device such as a set of dual-axis high-speed galvanometric scanning mirrors, a microscope body, a focusing device, a high-precision microscope stage, a high-sensitivity digital camera, a control workstation (or a personal computer), a processing module such as a FPGA chip, and application software for camera control, image processing, stage control, and optical path control. It is therefore an object to process the proteins, lipids, nucleic acids, or biochemical species in an area of interest specified by fluorescent signals or structural signature of cell images. Additional object is to collect a large amount of proteins, lipids, or nucleic acids through high content labeling and purification in order to identify biomolecules of interest in the area of interest by a mass spectrometer or a nucleic acid sequencer, followed by proteomic, metabolomic, or transcriptomic analyses.

The systems and the methods according to some embodiments of the invention take fluorescent staining or brightfield images first. Image processing is then performed automatically on the images by a connected computer using image processing techniques such as thresholding, erosion, filtering, or artificial intelligence trained semantic segmentation methods to determine the points or areas to be processed based on the criteria set by the operating individual. A high-speed scanning system is used for pattern illumination to shine the photosensitizing light on the points or areas to induce processing of proteins, lipids, nucleic acids, or biochemical species in the illumination regions. Alternatively, DMD or SLM may be used for pattern illumination. Photo-induced processing is achieved by including photosensitizer such as riboflavin, Rose Bengal or photosensitized protein (such as miniSOG and Killer Red, etc.) and chemical reagents such as phenol, aryl azide, benzophenone, $Ru(bpy)_3^{2+}$, or their derivatives for labeling purpose. The labeling groups can be conjugated with tagging reagents like biotin that is used for protein or nucleic acid pulldown. Photosensitizer, labeling reagent, and tagging reagent can be separate molecules, or can be one molecule with all three functions. Spatially controlled illumination can induce covalent binding of the labeling reagents onto amino acids, lipids, nucleic acids, or biochemical species in the specific region. As examples, streptavidin is used to isolate biotinylated proteins and then the labeled proteins are purified to be analyzed by a mass spectrometer. RNA may be isolated by associated protein pulldown and then analyzed by RNAseq or RTPCR. Because enough RNAs or proteins are needed to have low background results, efficient high-content labeling is thus a major requirement for this system.

Certain exemplary embodiments according to the present disclosure are described as below.

Figure 1B:
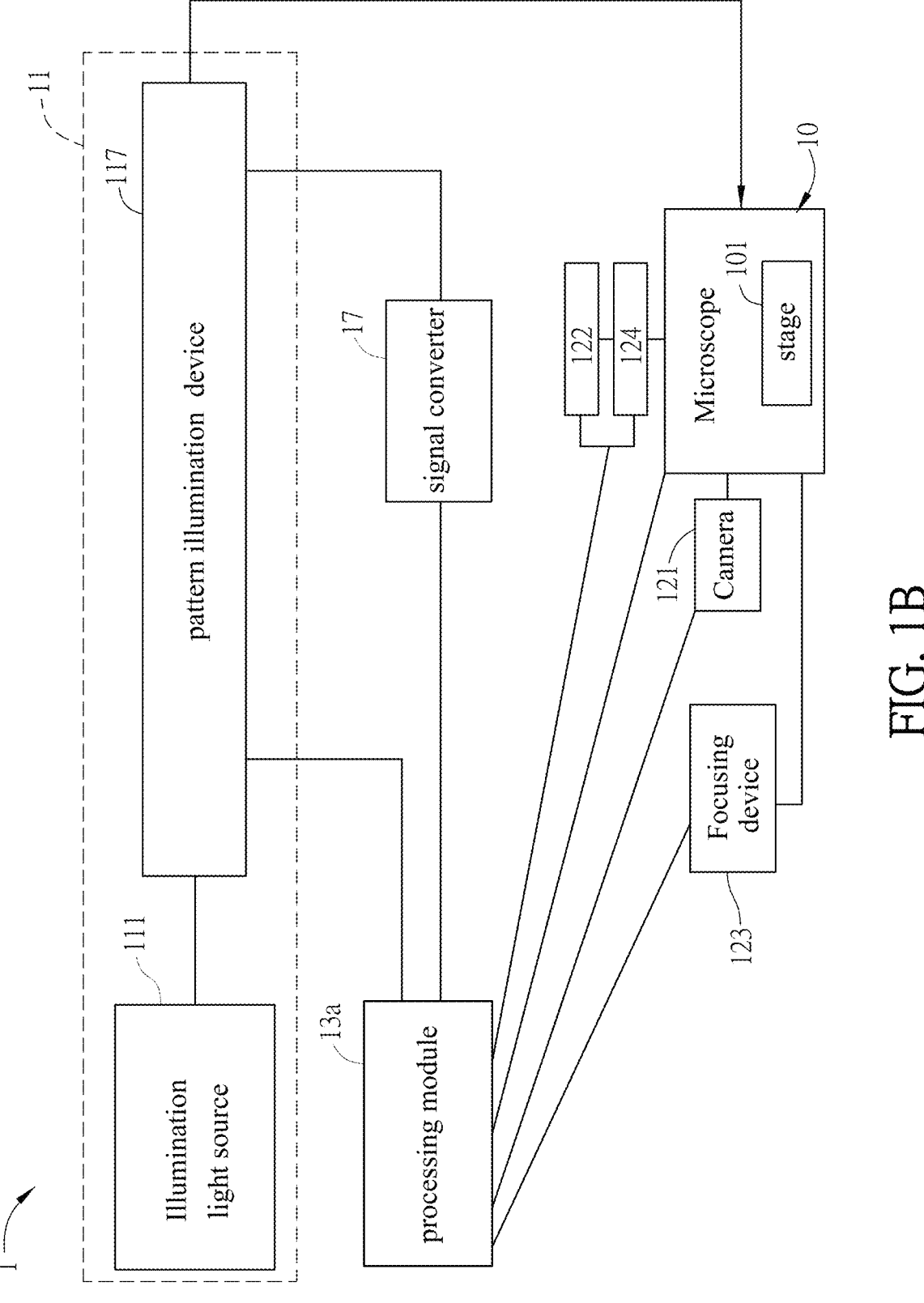
FIG. 1B depicts the optical path of the image-guided system of FIG. 1A.

This disclosure provides an embodiment which is also a microscope-based system for image-guided microscopic illumination. Please refer to FIGS. 1A and 1B. The microscope-based system of this embodiment comprises a microscope 10, an imaging assembly 12, an illuminating assembly 11, and a processing module 13a. The microscope 10 comprises an objective 102 and a stage 101. The stage 101 is configured to be loaded with a sample S. The imaging assembly 12 may comprise a (controllable) camera 121, an imaging light source 122, a focusing device 123, and a first shutter 124. Please further refer to both FIGS. 1B and 1D, the illuminating assembly 11 may comprise an illumination light source 111 and a patter illumination device 117. The patter illumination device 117 may include a second shutter 112, a lens module 113 (such as the relay lens 113a and 113b, a quarter wave plate 113c), at least a pair of scanning mirrors 115 and a scan lens 116. Alternatively, DMD or SLM can be used as the pattern illumination device 117.

In this embodiment, the processing module 13a is coupled to the microscope 10, the imaging assembly 12, and the illuminating assembly 11. The processing module 13a can be a computer, a workstation, or a CPU of a computer, which is capable of executing a program designed for operating this system.

The processing module 13a controls the imaging assembly 12 such that the camera 121 acquires at least one image of the sample S of a first field of view, and the image or images are transmitted to the processing module 13a and processed by the processing module 13a automatically in real-time based on a predefined criterion, so as to determine an interested region in the image S and so as to obtain a coordinate information regarding to the interested region. Later, the processing module 13a may control the pattern illumination device 117 of the illuminating assembly 11 to illuminate the interested region of the sample S according to the received coordinate information regarding to the interested region. Also, after the interested region is fully illuminated, the processing module 13a controls the stage 101 of the microscope 10 to move to a second field of view which is subsequent to the first field of view.

In this embodiment, the imaging light source 122 provides an imaging light through an imaging light path to illuminate the sample S during imaging the sample. The first shutter 124, along the imaging light path, is disposed between the image light source 122 and the microscope 10. The controllable camera 121 is disposed on the microscope 10 or on the imaging light path.

Also, the illuminating light source 111 provides an illuminating light through an illuminating light path to illuminate the sample S. The pattern illumination device 117, along the illuminating light path, is disposed between the illumination light source 111 and the microscope 10.

Figure 1C:
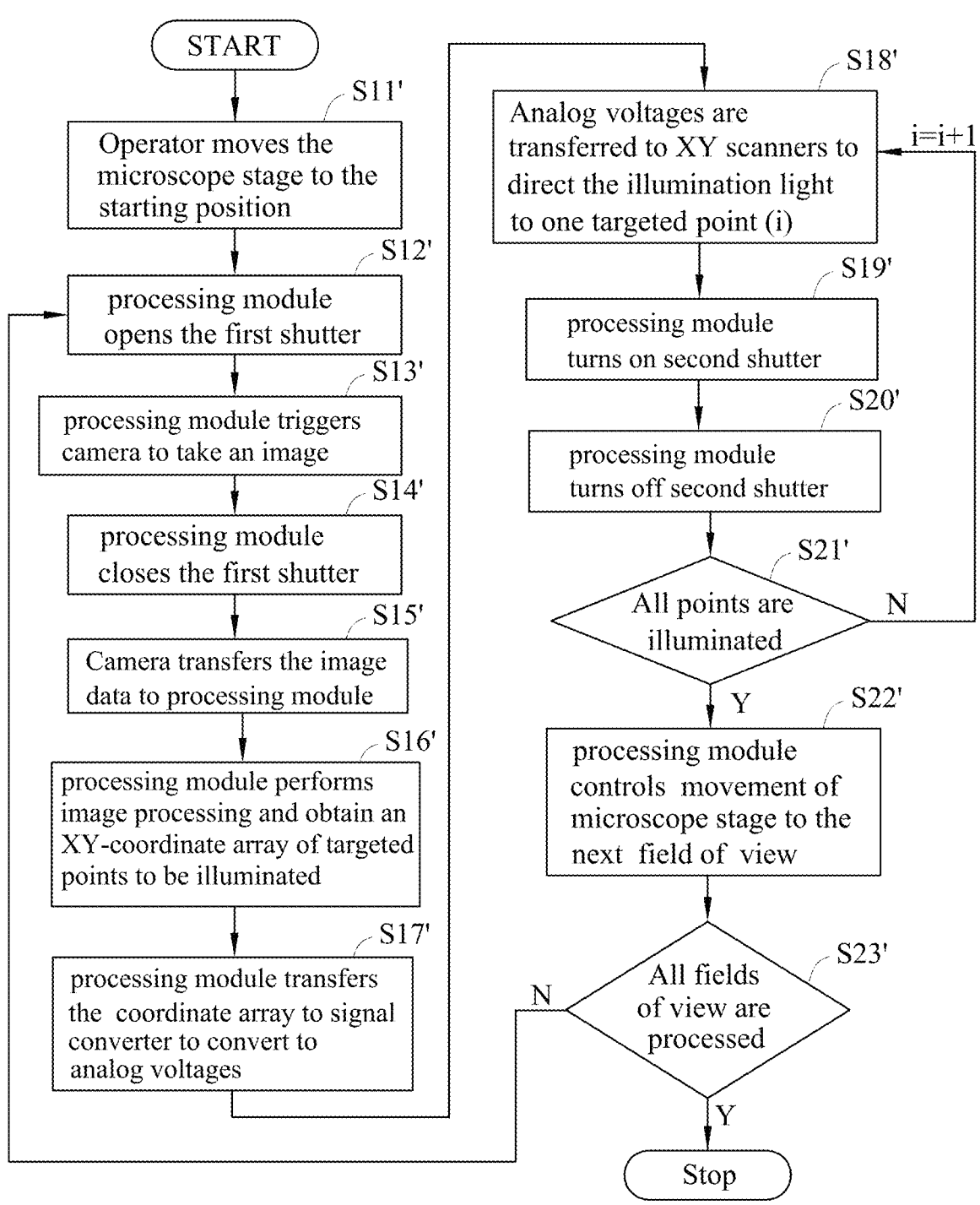
FIG. 1C is a flow chart of the image-guided method according to another embodiment of the present disclosure, which uses the image-guided system of FIG. 1A.

Please refer to FIG. 1C, which is a flow chart of the image-guided method according to this embodiment of the present disclosure. It is a more detailed example of the image-guided method described herein, but the present invention is not limited thereby. The process of the method depicted in FIG. 1C comprises the following steps S11' to S23'.

In brief, in the step S11', the operator moves the stage 101 of the microscope 10 to the starting position. In step S12', the processing module 13a opens the first shutter 124. In step S13', the processing module 13a triggers the camera 121 to take an image of the sample S. In step S14', the processing module 13a then closes the first shutter 124. In step S15', the camera 121 transfers the image data to the processing module 13a. In step S16', the processing module 13a performs image processing and obtains an XY-coordinate array targeted points to be illuminated (i.e. the "interested region" of the sample S). In step S17', the processing module 13a transfers the coordinate array to the signal converter (such as DAC) 17 to convert to analog voltages. In step S18', analog voltages are transferred to XY scanning mirrors 115 to direct the illumination light to one targeted point. In the step S19', the processing module 13a turns on the second shutter 112. In step S20', the processing module 13a turns off the second shutter 112. In the step S21', the system may check whether or not all targeted points are illuminated. In other words, if the targeted points are not fully illuminated yet, the procedure will go back to the step S18' and the processing module 13a in this step will control the XY scanning mirrors 115 to direct to the next point, and the second shutter on/off (i.e. steps S19' and S20'). Once all targeted points in the XY-coordinate array are illuminated, the procedure may then go to the next step. In the step S22', the processing module 13a controls movement of the stage 101 of the microscope 10 to the next field of view. In the step S23', the system will check whether or not all fields of view are processed. If all the fields of view of the sample S are processed, the whole procedure may come to an end. If not, the procedure will then go back to the step S12' to start another round of imaging, image processing, illumination, and stage movement after processes in each FOV. In other words, the same cycle of imaging, image processing, illumination, and stage movement is performed one FOV at a time until enough sample areas are illuminated.

In this embodiment, the image processing is done with real-time image processing techniques such as thresholding, erosion, filtering, or artificial intelligence trained semantic segmentation methods.

Because composition, variation or connection relationship to other elements of each detail elements of the microscope-based method can refer to the previous embodiments, they are not repeated here.

Figure 2A:
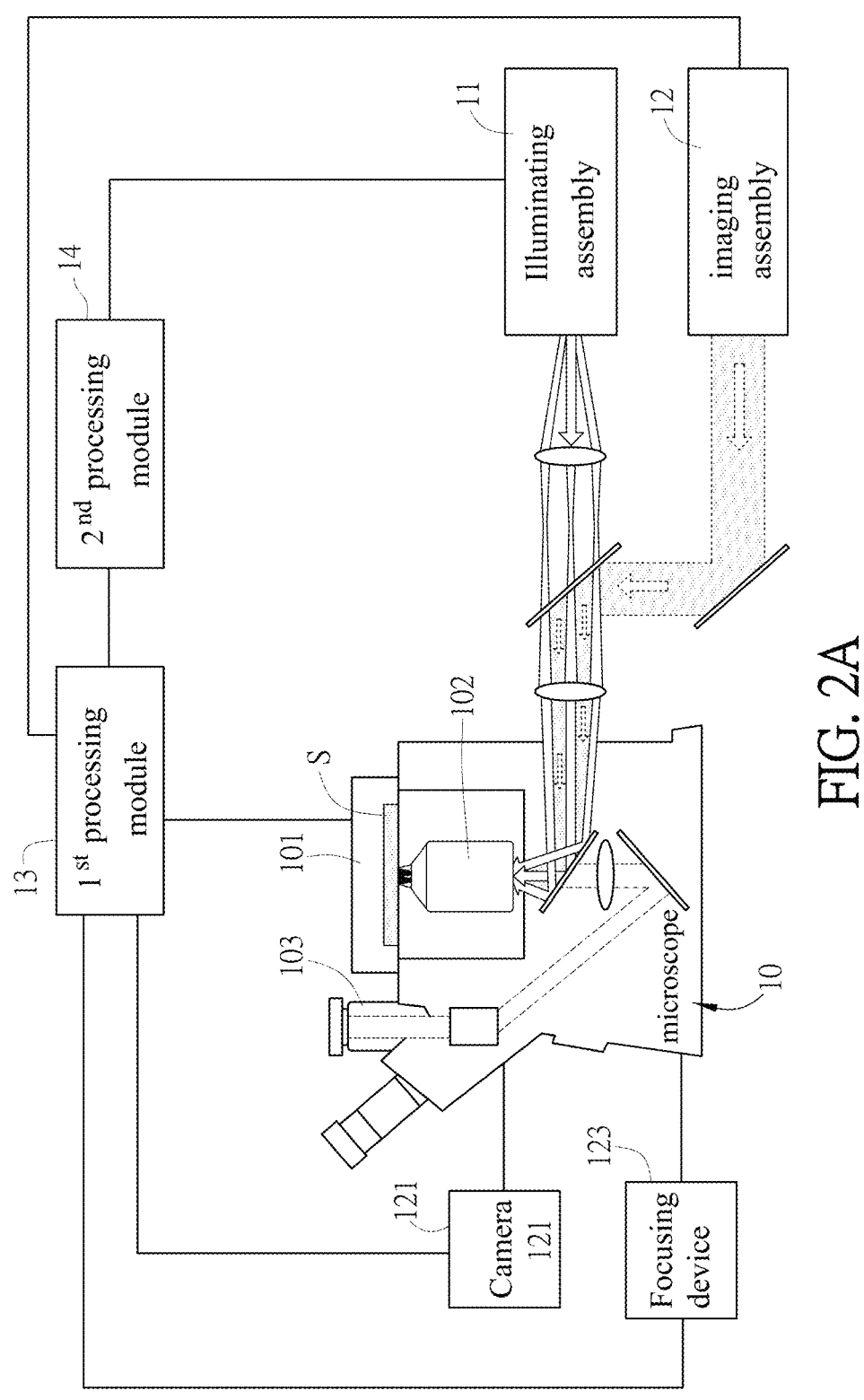
FIG. 2A represents a schematic diagram of another imaging-guided system according to another embodiment of the present disclosure.

This disclosure provides another embodiment which is also a microscope-based system for image-guided microscopic illumination. This system includes an additional processing module to improve illumination performance and will be describe in detail. Please refer to FIGS. 2A and 2B. FIG. 2A represents a schematic diagram of an imaging-guided system according to one embodiment of the present disclosure, and FIG. 2B depicts the optical path of the image-guided system of FIG. 2A.

Figure 2B:
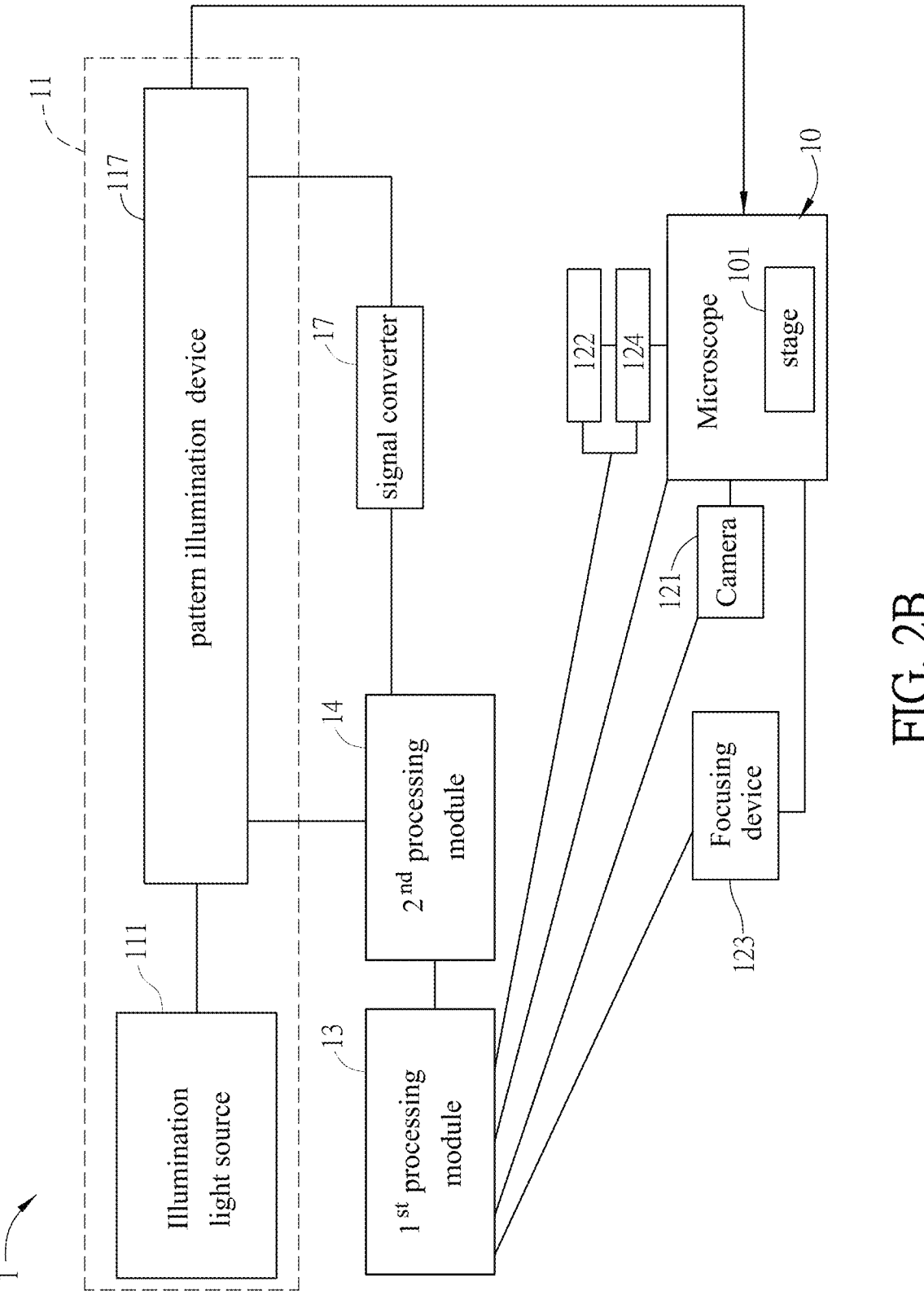
FIG. 2B depicts the optical path of the image-guided system of FIG. 2A.

As shown in FIGS. 2A and 2B, the microscope-based system 1 for image-guided microscopic illumination comprises a microscope 10, an illuminating assembly 11, an imaging assembly 12, a first processing module 13 and a second processing module 14. The microscope-based system 1 is designed to take a microscope image or images of a sample and use this image or these images to determine and shine an illumination pattern on the sample, finishing all steps for one image rapidly (e.g. within 300 ms), and within a short time (e.g., 10 hours) for the entire illumination process for a proteomic study.

The microscope 10 comprises a stage 101, an objective 102 and a subjective 103. The stage is configured to be loaded with a sample S. The stage 101 of the microscope 10 can be a high-precision microscope stage.

The imaging assembly 12 may comprise a camera 121, an imaging light source 122, a focusing device 123, and a first shutter 124. The camera 121 is mounted on the microscope 10. In detail, the camera 121 is coupled to the microscope 10 through the subjective 103 of the microscope 10. The focusing device is coupled to the camera 121 and controlled to facilitate an autofocusing process during imaging of the sample S. The imaging light source 122, which provides an imaging light (as shown in the shaded area in FIG. 2A from imaging assembly 12 to the objective 102) through an imaging light path (as shown with the route indicated by the open arrows in the shaded area depicting the imaging light in FIG. 2A) to illuminate the sample S. The first shutter 124, along the imaging light path, is disposed between the image light source 122 and the microscope 10. The imaging light source 122 can be a tungsten-halogen lamp, an arc lamp, a metal halide lamp, a LED light, a laser, or multiple of them. The shuttering time of the first shutter may vary with the type of the imaging light source 121. Using an LED light source as an example, the shuttering time of the first shutter 124 is 20 microseconds.

If one would like to perform two color imaging, the shutter of the first color light is turned off and the shutter of the second color light is turned on by the first processing module 13. This may take another 40 microseconds. The camera 121 then takes another image with an exposure time of another 20 millisecond. The first processing module 13 then turns off the shutter of the second color light.

Figure 1D:
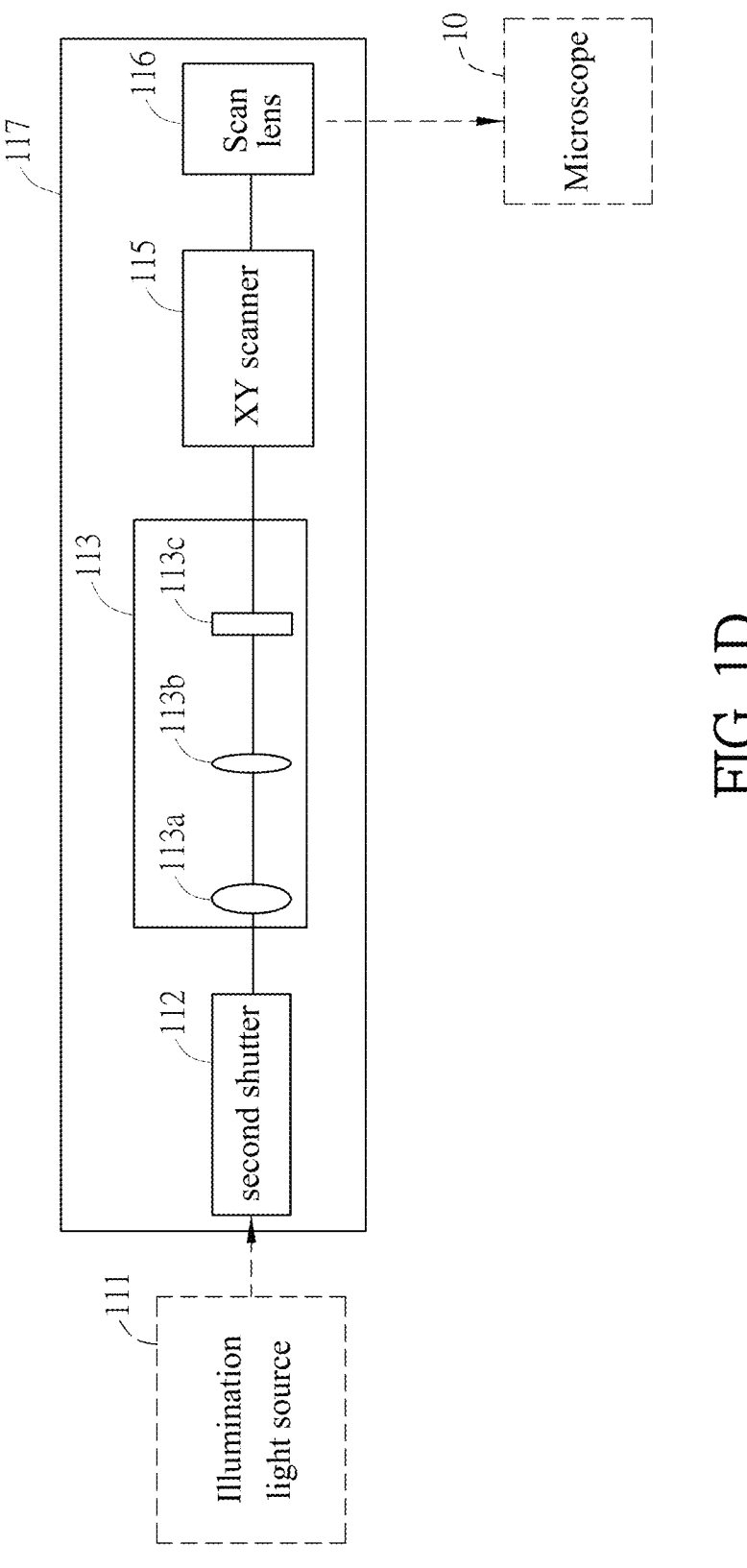
FIG. 1D depicts one type of pattern illumination devices shown in FIGS. 1B, 2B, and 3B.

In this embodiment, please further refer to both FIGS. 2B and 1D, the illuminating assembly 11 comprises an illuminating light source 111, and a pattern illumination device 117 including a second shutter 112, a lens module 113 (such as the relay lens 113a and 113b, a quarter wave plate 113c), at least a pair of scanning mirrors 115 and a scan lens 116. Alternatively, DMD or SLM can be used as the pattern illumination device 117. The illuminating light source 111 provides an illuminating light (as shown in the open arrows from the illuminating assembly 11 to the objective 102 in FIG. 2A) through an illuminating light path to illuminate the sample S. The second shutter 112, along the illuminating light path, is disposed between the illuminating light source 111 and the microscope 10. The pair of scanning mirrors 115, along the illuminating light path, is disposed between the second shutter 112 and the microscope 10. The camera 121 may be a high-end scientific camera such as an sCMOS or an EMCCD camera with a high quantum efficiency, so that a short exposure time is possible. To get enough photons for image processing, the exposure time is, for example, 20 milliseconds.

The first processing module 13 is coupled to the microscope 10 and the imaging assembly 12. In detail, the first processing module 13 is coupled and therefore controls the camera 121, the imaging light source 122, the first shutter, the focusing device 123, and the stage 101 of the microscope 10, for imaging, focus maintenance, and changes of fields of view. The first processing module 13 can be a computer, a workstation, or a CPU of a computer, which is capable of executing a program designed for operating this system. The first processing module 13 then triggers the camera 121 to take the image of the sample S of a certain field of view (FOV). In addition, the camera 121 can be connected to the first processing module 13 through an USB port or a Camera Link thereon. The controlling and the image-processing procedures of this system will be discussed more detailed in the following paragraphs.

In this embodiment, the second processing module 14 is coupled to the illuminating assembly 11 and the first processing module 13. In detail, the second processing module 14 is coupled to and therefore controls the pattern illumination device 117, including the second shutter 112, and the pair of scanning mirrors, for illuminating the targeted points in the interested region determined by the first processing module 13. The second processing module may be a FPGA, an ASIC board, another CPU, or another computer. The controlling and the image-processing procedures of this system will be discussed more detailed in the following paragraphs.

In brief, the microscope-based system 1 is operated as below. The first processing module 13 controls the imaging assembly 12 such that the camera 121 acquires at least one image of the sample S of a first field of view. The image or images are then transmitted to the first processing module 13 and processed by the first processing module 13 automatically in real-time based on a predefined criterion, so as to determine an interested region in the image and so as to obtain a coordinate information regarding to the interested region. The image processing algorithm is developed independently beforehand using image processing techniques such as thresholding, erosion, filtering, or artificial intelligence trained semantic segmentation methods. Later, the coordinate information regarding to the interested region is transmitted to the second processing module 14. The second processing module 14 controls the illuminating assembly 12 to illuminate the interested region (or, namely, irradiating those targeted points in the interested region) of the sample S according to the received coordinate information regarding to the interested region. In addition, after the interested region is fully illuminated (or all the targeted points in the interested region are irradiated), the first processing module 13 controls the stage 101 of the microscope 10 to move to the next (i.e. the second) field of view which is subsequent to the first field of view. After moving to the subsequent field of view, the method further repeats imaging-image processing-illumination steps, until interested regions of all designated fields of view are illuminated.

Moreover, this disclosure also provides another embodiment which is a microscope-based method for image-guided microscopic illumination. The microscope-based method uses the microscope-based system described above and comprises the following steps (a) to (e): (a) triggering the camera 121 of the imaging assembly 12 by the first processing module 13 to acquire at least one image of the sample S of a first field of view, and the sample S is loaded on the stage 101 of the microscope 10; (b) automatically transmitting the image or images of the sample S to the first processing module 13; (c) based on a predefined criterion, performing image processing of the sample S automatically in real-time by the first processing module 13 to determine an interested region in the image and obtain a coordinate information regarding to the interested region; (d) automatically transmitting the coordinate information regarding to the interested region to the second processing module 14; (e) controlling an illumination assembly 11 by the second processing module 14 according to the received coordinate information to illuminate the interested region in the sample S. Besides, in this embodiment, after the interested region is fully illuminated, the method may further comprise a step of: controlling the stage 101 of the microscope 10 by the first processing module 13 to move to the next (i.e. the second) field of view which is subsequent to the first field of view.

The microscope-based system 1 used herein are substantially the same as that described above, and the details of the composition and variations of the compositing elements are omitted here.

Figure 2C:
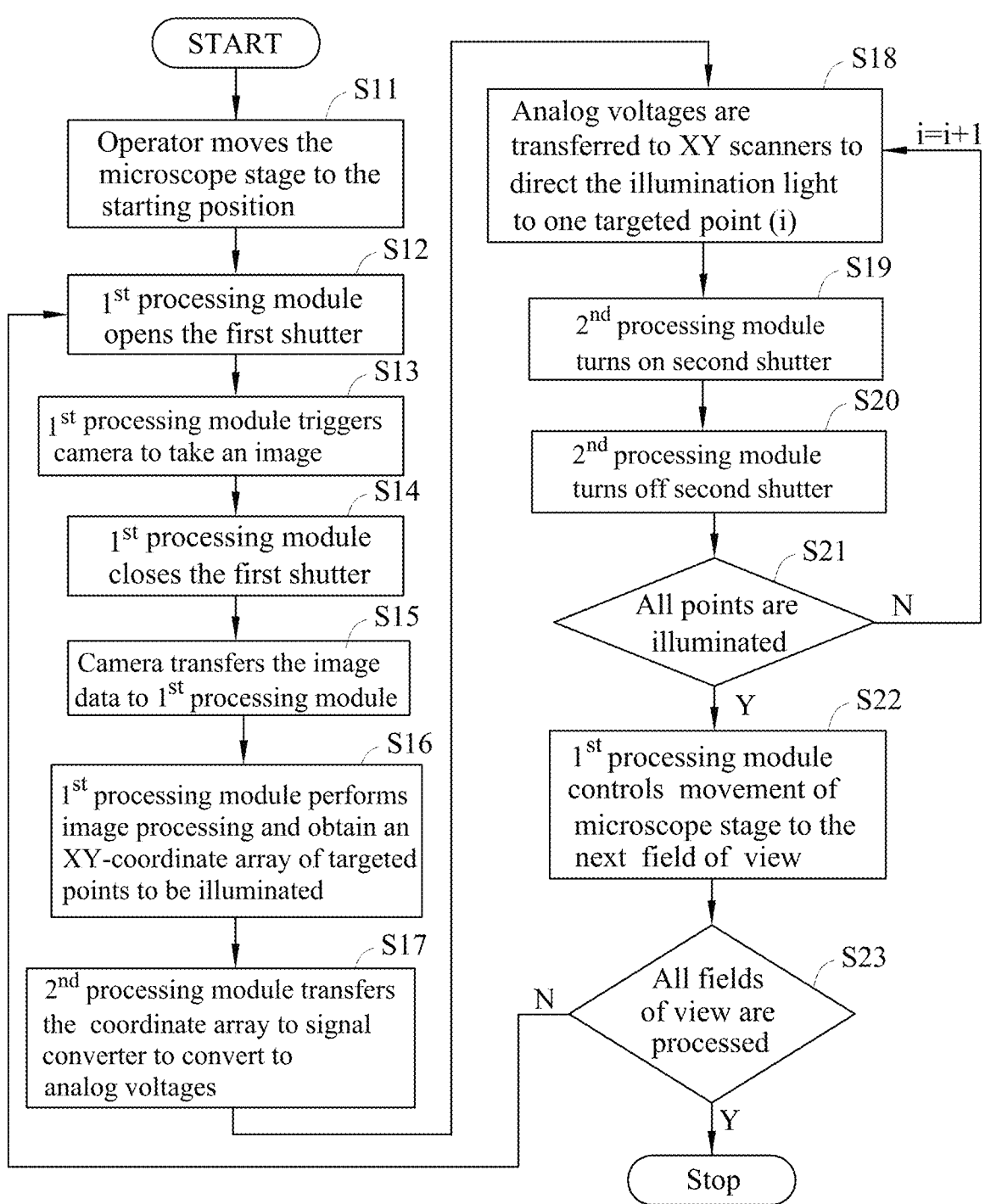
FIG. 2C is a flow chart of another image-guided method according to still another embodiment of the present disclosure, which uses the image-guided system of FIG. 2A.

Please refer to FIG. 2C, which is a flow chart of the image-guided method according to this embodiment of the present disclosure. It is a more detailed example of the image-guided method described herein, but the present invention is not limited thereby. The process of the method depicted in FIG. 2C comprises the following steps S11 to S23.

In step S11: The operator moves the stage 101 of the microscope 10 to the starting position.

In step S12: the first processing module 13 opens the first shutter 124.

In step S13: the first processing module 13 triggers the camera 121 to take an image of the sample S.

In step S14: the first processing module 13 then closes the first shutter 124.

In step S15: the camera 121 transfers the image data to the first processing module 13. After the camera 121 takes the image of the sample S, it now has the data for the image, for example, a 2048×2048-pixel image with 16 bits for each pixel, equivalent to ~0.5 Megabytes (MB). This data can then be transferred to the first processing module 13. It may take less than 1 ms to complete the data transfer.

In step S16: the first processing module 13 performs image processing and obtains an XY-coordinate array targeted points to be illuminated (i.e. the "interested region" of the sample S). In other words, after receiving the image data transferred from the camera 121, the CPU of the first processing module 13 performs image processing to determine the interested regions (or targeted points) of the sample S to be illuminated (or, namely, excited, irradiated, or photo-activated) by the illuminating light source 111. The interested regions or the targeted points can be defined by the user. They can be the locations of cell nuclei, nucleoli, mitochondria, or any cell organelles or sub-organelles. They can be the locations of a protein of interest, such as myosin V, E-cadherin, p53, or any. They can be a morphological signature, such as primary cilia that are longer than 2 μm or microtubules close to the aster. They can also be regions at a specific time point, such as dividing nuclei. They can also be a feature defined by two color imaging, such as the colocation sites of proteins A and B, or actin filaments close to the centrosome.

Now, there are a lot of image processing operations that are readily available for the first processing module 13. One can use existing operations or combinations of operations to achieve various image processing demands described above. For example, thresholding, erosion, dilation, edge detection, filtering, segmentation, or transformation can be used to define the regions of interest. Artificial intelligence trained semantic segmentation methods can also be used. The operations can be affected by the conditions of images, so the criteria may be tuned case by case. Basically all operations are matrix-based linear algebra operations. Because the different complexity levels of different image processing goals, the time required for this step is varying. A simple thresholding operation takes 2 milliseconds for an image, whereas a complex combination of operations can take 100 milliseconds for an image. A series of operations require the space of multiple copies of matrices, so an integrated DRAM on an FPGA board as the second processing module 14 may be needed.

In addition, the illumination light source 111 is different from the imaging light source 122 for sample imaging. The illumination light source 111 here is used only to illuminate the interested regions determined by image processing performed in the step S16. There are many potential usages for illuminating selected areas based on the image of the sample S. For example, one can perform photo-induced molecular tagging, photoconversion, or studies of proteomics, transcriptomics, and metabolomics for molecules with the introduction of photochemical reactions in these interested regions. As described below, the illumination of the interested regions is achieved by point scanning. That is, the illumination light source 111 may be a laser, and the point scanning is achieved by scanning mirrors 115 such as galvanometer mirrors. That is, it is similar to a confocal microscope setup. If one would like to have well-controlled axial illumination, one may use two-photon microscopy. In this case, one can use a femtosecond laser as the illumination light source 111.

Moreover, as shown in FIGS. 2A, 2B and 1D, the light path of the illumination starts from the illumination light source 111. The second shutter 112 is needed for this illumination light source 111. To reach a high switching speed for the point illumination, a mechanical shutter may not be fast enough. One may use an acousto-optic modulator (AOM) or an electro optic modulator (EOM) to achieve the high speed. For example, an AOM can reach 25-nanosecond rise/fall time, enough for the method and system in this embodiment. After the second shutter 112, the beam size may be adjusted by a pair of relay lenses 113$a$ and 113$b$. After the relay lenses 113$a$ and 113$b$, the quarter wave plate 113$c$ may facilitate to create circular polarization. The light then reaches the pairs of scanning mirrors (i.e., XY-scanning mirrors) 115 to direct the illumination light to the desired point one at a time. The light then passes a scan lens 116 and a tube lens (included in a microscope, not shown here) and the objective 102 of the microscope 10 to illuminate the targeted point of the sample S. An objective 102 with a high numerical aperture (NA) may be needed to have enough light intensity for photochemical reactions or photoconversion.

Figure 4A:
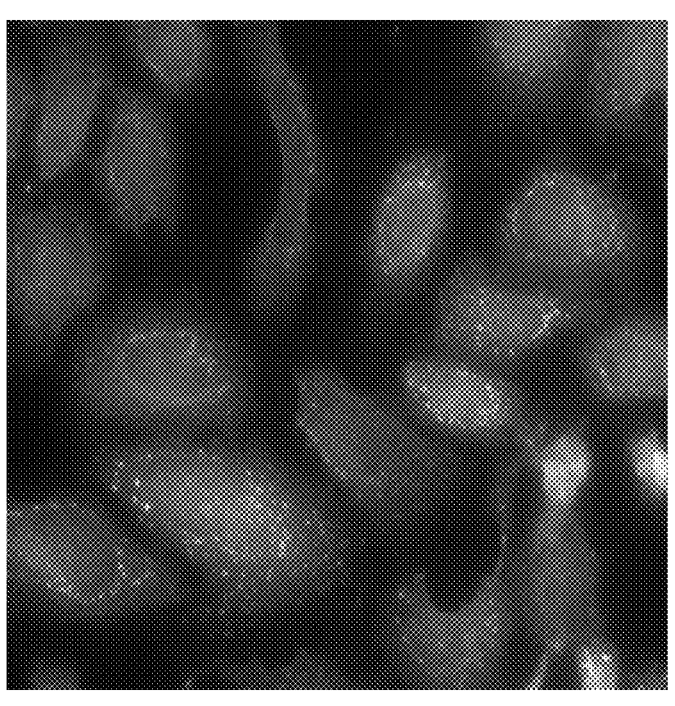
FIGS. 4A and 4B are two images produced by the image processing of one example of the present disclosure to define the regions of stress granules.
Figure 4B:
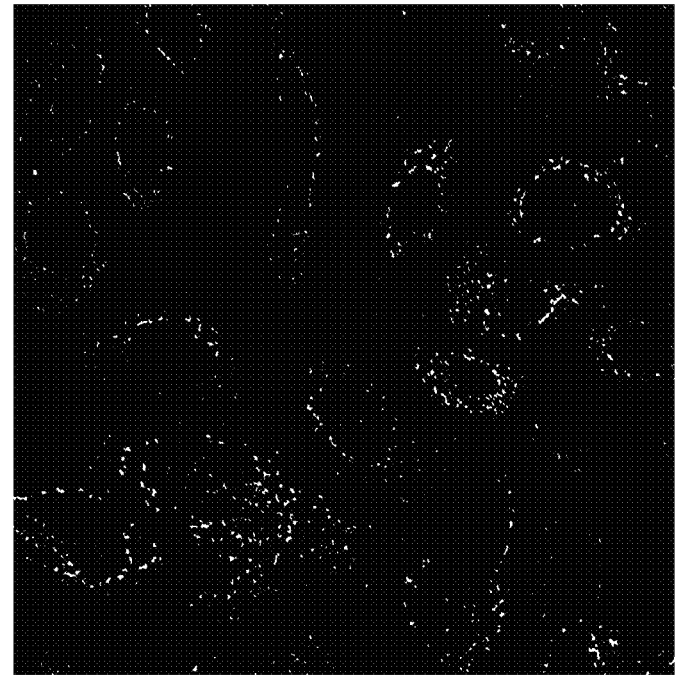
Figure 5:
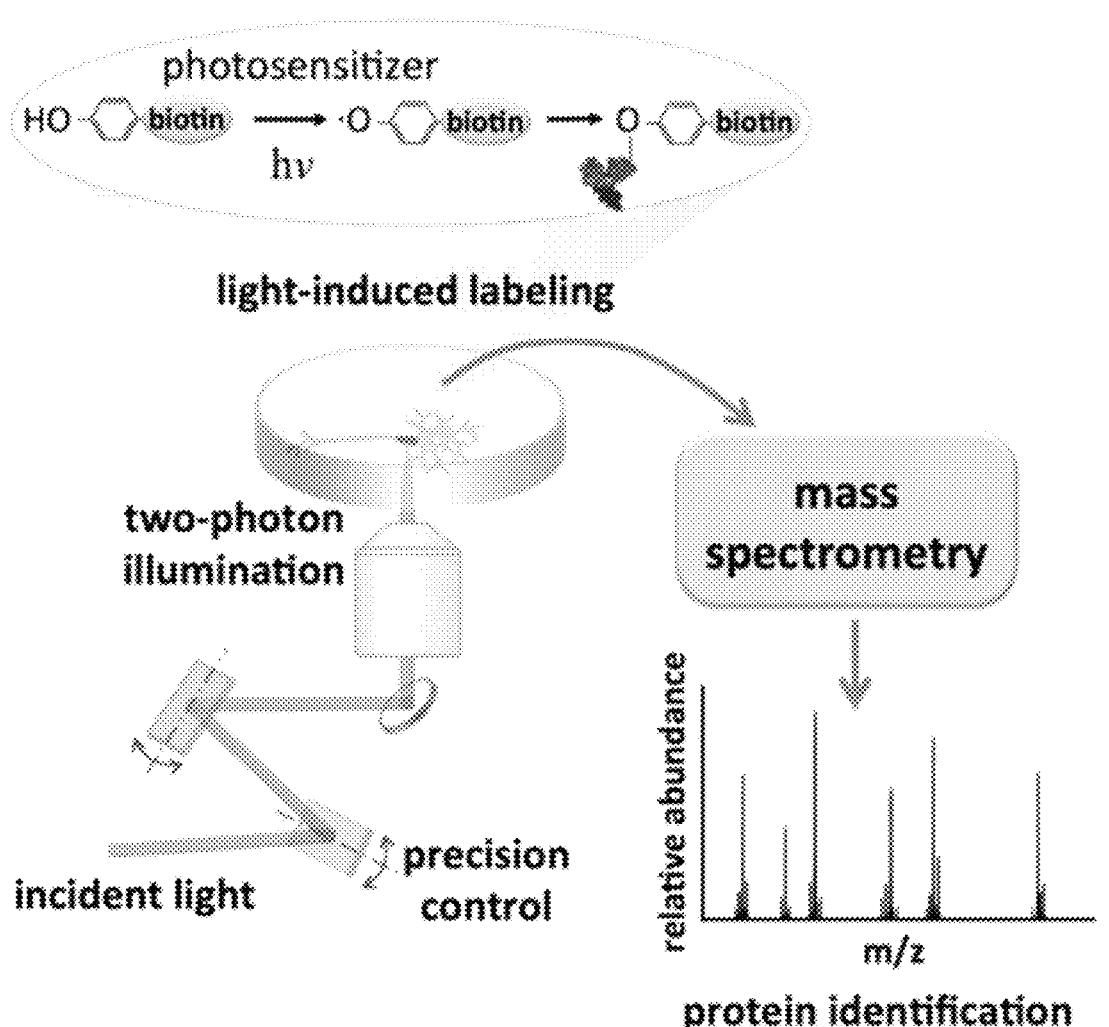
FIG. 5 represents an optoproteomics methodology provided by the present disclosure.

The output of image processing after the step S16 is an XY-coordinate array (2D array) of targeted points to be illuminated covering the interested regions defined by the user. The number of illumination points per field of view (FOV) can vary depending the user's criteria. In some circumstances, 1000 points per FOV are possible. In this case, the output contains 1000 pairs of floating point numbers. FIGS. 4A and 4B are two images produced by the image processing of one example of the present disclosure to define the regions of stress granules.

Please now return to the procedures of this method. In step S17: the second processing module 14 transfers the coordinate array to a signal converter (such as a digital-analog convertor, DAC) 17 to convert to analog voltages.

In step S18: Analog voltages are transferred to XY scanning mirrors 115 to direct the illumination light to one targeted point.

In the step S17 and S18, for each pair of the XY coordinate, the corresponding angles of the two XY scanning mirrors 115 and the corresponding voltages to drive them to the position are calculated. Illumination of these 1000 targeted points is performed one point at a time. The illumination order of these points may be optimized through trajectory planning to minimize the total time needed to visit all points. For example, trajectory planning can be performed by using the solution to the traveling salesman problem (for example, see The Traveling Salesman Problem: A Guided Tour of Combinatorial Optimization by Lawler et al). The 1000 pairs of floating point numbers of voltages are then transferred through the second processing module 14 to the signal converter 17, which converts the digital numbers into analog signals. The analog signals are then transferred to the XY scanning mirrors 115 and the XY scanning mirrors 115 are driven to point to the first targeted illumination point. The response time of a galvo can reach 5 microseconds.

In step S19: the second processing module 14 turns on the second shutter 112.

In step S20: the second processing module 14 turns off the second shutter 112.

In the step S19, the second processing module 14 controls the voltage of the second shutter 112 to turn it on. A specific voltage may be determined to reduce the illumination light source power to a desired level for photochemical reactions or photoconversion. If the power reduction cannot be reached by the second shutter, one may add a polarization beam splitter and a half wave plate to reduce the power. The illumination duration depends on the need of photochemical reactions or photoconversion. For example, 100 microseconds may be needed for a specific reaction. After this duration, in the step S20, the second processing module 14 turns the second shutter 112 off.

In the step S21, the system may check whether or not all targeted points are illuminated. In other words, if the targeted points are not fully illuminated yet, the procedure will go back to the step S18 and the second processing module 14 in this step will control the XY scanning mirrors 115 to direct to the next point, and the second shutter on/off (i.e. steps S19 and S20). Once all targeted points (e.g., those 1000 targeted points) in the XY-coordinate array are illuminated, the procedure may then go to the next step. Together, these 1000 points may take about 100 milliseconds.

In the step S22: the first processing module 13 controls movement of the stage 101 of the microscope 10 to the next field of view. In this step, the first processing module 13 then controls the movement of the stage 101 of the microscope 10 to the next (adjacent) FOV. The stage movement takes about 2 milliseconds.

In the step S23, the system will check whether or not all fields of view are processed. If all the fields of view of the sample S are processed, the whole procedure may come to an end. If not, the procedure will then go back to the step S12 to start another round of imaging, image processing, illumination, and stage movement after processes in each FOV. In other words, the same cycle of imaging, image processing, illumination, and stage movement is performed one FOV at a time until enough sample areas are illuminated. That is, many FOVs are illuminated to perform enough photochemical reactions or photoconversion. In general, 300 milliseconds may be enough for each cycle.

Moreover, for a specific problem where 10 femtomolar (fmol) of a photoconverted molecule is needed, one equivalently needs $6 \times 10^9$ copies of a molecule. Assuming that for each illumination point, the illumination is enough to photoconvert 50 copies of that molecule. This is possible for the light resolution (about 250 nanometers in diameter). Hence, one needs to illuminate $(6 \times 10^9)/50$, or $1.2 \times 10^8$ points. In the case where each FOV has 1000 illumination points, one will need to illuminate a total of $1.2 \times 10^5$ FOVs. If spending 300 milliseconds for each FOV, one will need a total of $3.6 \times 10^4$ seconds, or 10 hours to perform enough reactions. This total time is comparable to a 3D printing process. Without optimizing the time of each step, the total time may become impractical for real problems.

Because composition, variation or connection relationship to other elements of each detail elements of the microscope-based method can refer to the previous embodiments, they are not repeated here.

Figure 3A:
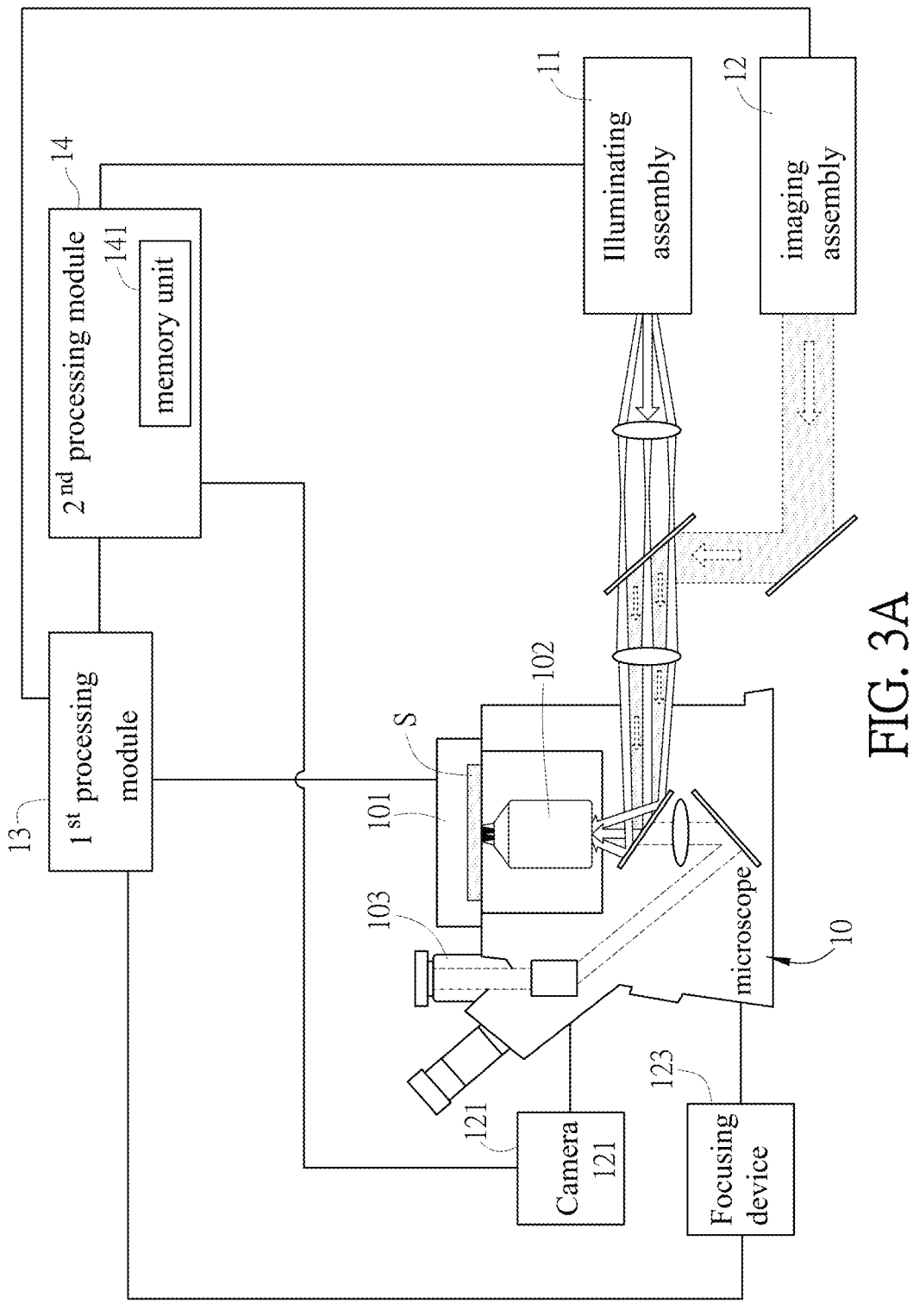
FIG. 3A represents a schematic diagram of yet another imaging-guided system according to another embodiment of the present disclosure.
Figure 3B:
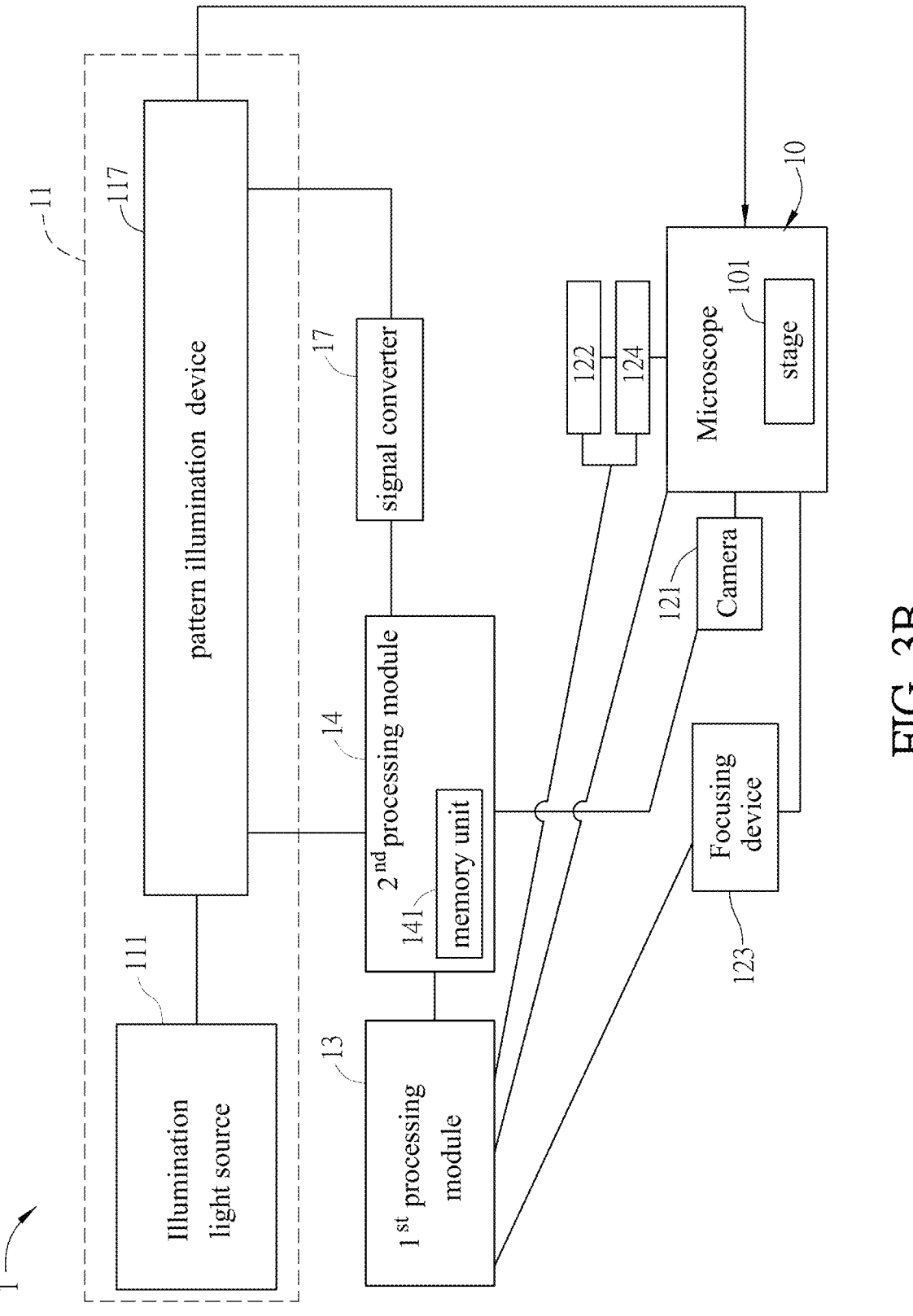
FIG. 3B depicts the optical path of the image-guided system of FIG. 3A.

Also, this disclosure also provides another embodiment which is another microscope-based system for image-guided microscopic illumination. The microscope-based system for image-guided microscopic illumination is substantially the same as that is described above. Please refer to FIGS. 3A and 3B. In this embodiment, the microscope-based system 1 comprises a microscope 10, an illuminating assembly 11, an imaging assembly 12, a first processing module 13 and a second processing module 14. The microscope 10 comprises a stage 101, an objective 102 and a subjective 103, and the stage 10 is configured to be loaded with a sample S. Please further refer to both FIGS. 3B and 1D, the illuminating assembly 11 comprises an illuminating light source 111, and a pattern illumination device 117 including a second shutter 112, at least one relay lens (such as the relay lens 113*a* and 113*b*), a quarter wave plate 113*c*, at least a pair of scanning mirrors 115 and a scan lens 116. Alternatively, DMD or SLM can also be used as the pattern illumination device 117. The imaging assembly 12 may comprise a camera 121, an imaging light source 122, a focusing device 123, and a first shutter 124. The camera 121 is mounted on the microscope 10.

The major difference between the systems described in the previous embodiment and here is that the first processing module 13 here is coupled to the stage 101 of the microscope 10 and the imaging light source 122 and the first shutter 124 of the imaging assembly 12. However, the second processing module 14 here comprises a memory unit 141 and is coupled to the camera 121, the illuminating assembly 11, and the first processing module 13. In other words, in this embodiment, the camera 121 is controlled by the second processing module 14 instead of the first processing module (i.e. the computer) 13. The camera 121 can be connected to the second processing module 14 through a Camera Link if a high speed of image data transfer and processing is required. The memory unit 141 can be a random access memory (RAM), flash ROM, or a hard drive, and the random access memory may be a dynamic random access memory (DRAM), a static random access Memory (SRAM), or a zero-capacitor random access memory (Z-RAM).

Hence, in the system 1 embodied here, it is operated as follows. The first processing module 13 controls the imaging assembly 12 and the second processing module controls 14 the camera 121 such that the camera 121 acquires at least one image of the sample S of a first field of view. The image or images are then automatically transmitted to the memory unit 141 to the second processing module 14. Image processing is then performed by the second processing module 14 automatically in real-time based on a predefined criterion, so as to determine an interested region in the image and so as to obtain a coordinate information regarding to the interested region. Later, the second processing module 14 controls the illuminating assembly 11 to illuminate the interested region of the sample S according to the received coordinate information regarding to the interested region.

Because composition, variation or connection relationship to other elements of each detail elements of the microscope-based system 1 can refer to the previous embodiments, they are not repeated here.

Also, this disclosure also provides still another embodiment which is another microscope-based method for image-guided microscopic illumination. The microscope-based method for image-guided microscopic illumination is substantially the same as that is described above. Please also refer to FIGS. 3A, 3B and 1D, the microscope-based method for image-guided microscopic illumination comprises the following steps through (a) to (d): (a) controlling the imaging assembly 12 by the first processing module 13 and triggering the camera 121 of the imaging assembly 12 by the second processing module 14 to acquire at least one image of the sample S of a first field of view, and the sample S is loaded on the stage 101 of the microscope 10; (b) automatically transmitting the image or images of the sample S to the memory unit 141 of the second processing module 14; (c) based on a predefined criterion, performing image processing of the sample S automatically in real-time by the second processing module 14 to determine an interested region in the image and to obtain a coordinate information regarding to the interested region; and (d) controlling the illuminating assembly 11 by the second processing module 14 to illuminate the interested region in the sample S according to the received coordinate information.

Figure 3C:
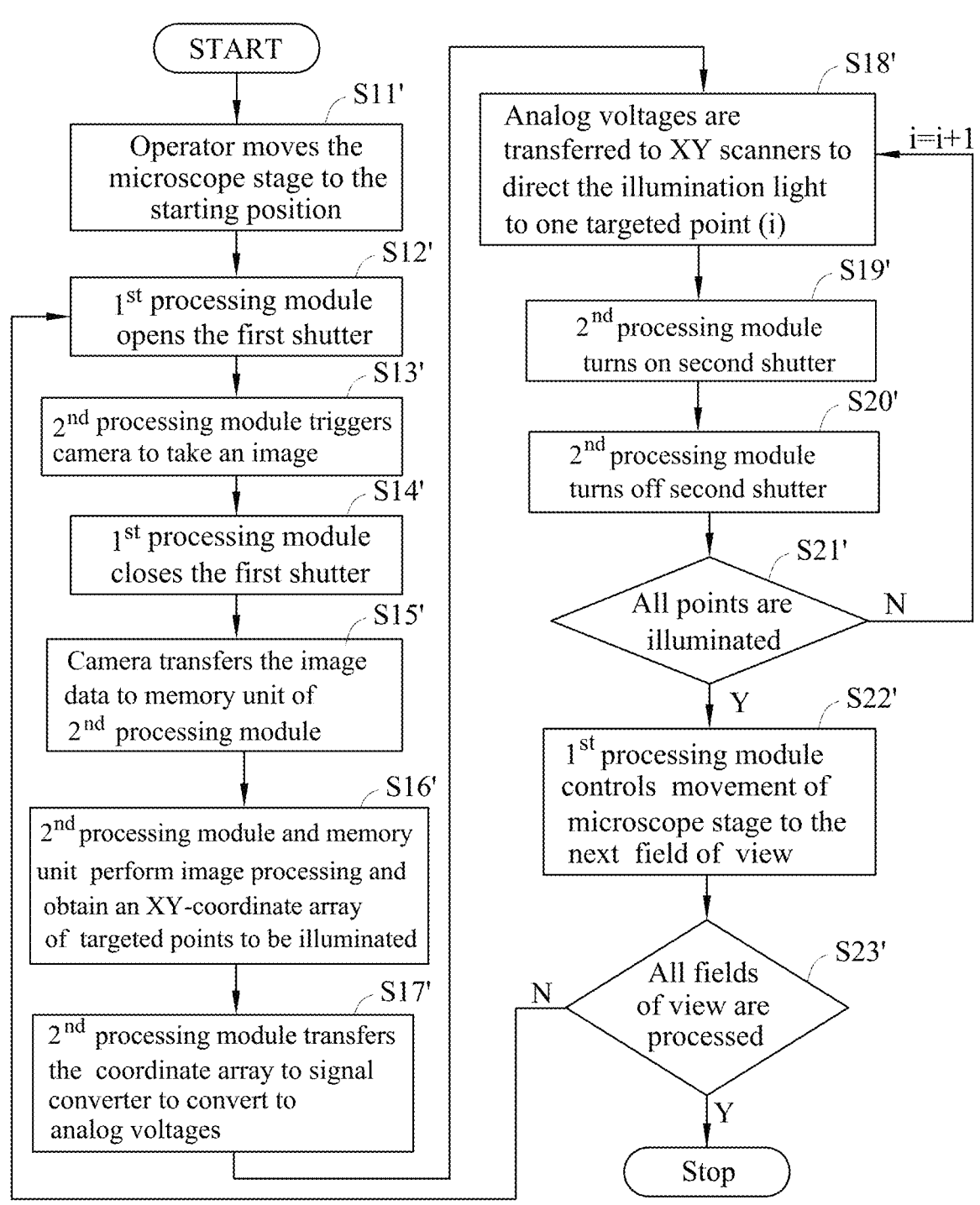
FIG. 3C is a flow chart of the image-guided method according to still another embodiment of the present disclosure, which uses the image-guided system of FIG. 3A.

Please refer to FIG. 3C, which is a flow chart of the image-guided method according to this embodiment of the present disclosure. It is a more detailed example of the image-guided method described herein, but the present invention is not limited thereby. The process of the method depicted in FIG. 3C comprises the following steps S11' to S23'.

In brief, in the step S11', the operator moves the stage 101 of the microscope 10 to the starting position. In step S12', the first processing module 13 opens the first shutter 124. In step S13', the second processing module 14 triggers the camera 121 to take an image of the sample S. In step S14', the first processing module 13 then closes the first shutter 124. In step S15', the camera 121 transfers the image data to the memory unit (e.g., DRAM) 141 of the second processing module 14. In step S16', the second processing module 14 and the memory unit (e.g., DRAM) 141 perform image processing and obtaining an XY-coordinate array targeted points to be illuminated (i.e., the "interested region" of the sample S). In step S17', the second processing module 14 transfers the coordinate array to the signal converter (such as DAC) 17 to convert to analog voltages. In step S18', analog voltages are transferred to XY scanning mirrors 115 to direct the illumination light to one targeted point. In the step S19', the second processing module 14 turns on the second shutter 112. In step S20', the second processing module 14 turns off the second shutter 112. In the step S21', the system may check whether or not all targeted points are illuminated. In other words, if the targeted points are not fully illuminated yet, the procedure will go back to the step S18' and the second processing module 14 in this step will control the XY scanning mirrors 115 to direct to the next point, and the second shutter on/off (i.e., steps S19' and S20'). Once all targeted points in the XY-coordinate array are illuminated, the procedure may then go to the next step. In the step S22', the first processing module 13 controls movement of the stage 101 of the microscope 10 to the next field of view. In the step S23', the system will check whether or not all fields of view are processed. If all the fields of view of the sample S are processed, the whole procedure may come to an end. If not, the procedure will then go back to the step S12' to start another round of imaging, image processing, illumination, and stage movement after processes in each FOV. In other words, the same cycle of imaging, image processing, illumination, and stage movement is performed one FOV at a time until enough sample areas are illuminated.

Because composition, variation or connection relationship to other elements of each detail elements of the microscope-based method can refer to the previous embodiments, they are not repeated here.

The following examples of the invention will describe the practical application.

Practical Example 1. The system and the method can be used to reveal the proteome of cell nuclei. First, cell nuclei are imaged by staining with an anti-nuclear pore complex proteins antibody. After imaging, image processing analysis is performed to generate a series of point coordinates to be scanned by the photosensitizing light source. And then, the galvanometric scanners are controlled to scan these point coordinates. This illumination leads to free radical release of a photosensitizer, and thus results in biotinylation of amino acids in the scanned region. A large number of fields are imaged and illuminated to have enough biotinylated samples. The biotinylated amino acids are then purified and mass spectrometry is performed to identify the proteome of cell nuclei. We were able to perform the proteomic analysis of biotinylated samples using this invention and identified nuclear proteins by this high-content photo-induced biotinylation as shown in Table 1 as below.

TABLE 1

Top scored nuclear proteins found using our method:

| Gene Symbol | Description | Score Mascot |
| --- | --- | --- |
| PCNA | Proliferating cell nuclear antigen OS = Homo sapiens GN = PCNA PE = 1 SV = 1 | 479 |
| RFC2 | Replication factor C subunit 2 OS = Homo sapiens GN = RFC2 PE = 1 SV = 3 | 257 |
| RFC4 | Replication factor C subunit 4 OS = Homo sapiens GN = RFC4 PE = 1 SV = 2 | 207 |
| SMARCC2 | SWI/SNF complex subunit SMARCC2 OS = Homo sapiens GN = SMARCC2 PE = 1 SV = 1 | 178 |
| PBK | Lymphokine-activated killer T-cell-originated protein kinase OS = Homo sapiens GN = PBK PE = 1 SV = 3 | 150 |
| TSPYL5 | Testis-specific Y-encoded-like protein 5 OS = Homo sapiens GN = TSPYL5 PE = 1 SV = 2 | 128 |
| GATAD2B | Transcriptional repressor p66-beta OS = Homo sapiens GN = GATAD2B PE = 1 SV = 1 | 109 |
| SAAL1 | Protein SAAL1 OS = Homo sapiens GN = SAAL1 PE = 1 SV = 2 | 108 |
| FUBP1 | Far upstream element-binding protein 1 OS = Homo sapiens GN = FUBP1 PE = 1 SV = 3 | 102 |
| POLR1E | DNA-directed RNA polymerase I subunit RPA49 OS-Homo sapiens GN = POLR1E PE = 1 SV = 2 | 95 |
| TATDN1 | Putative deoxyribonuclease TATDN1 OS = Homo sapiens GN = TATDNI PE = 1 SV-2 | 89 |
| FTO | Alpha-ketoglutarate-dependent dioxygenase FTO OS = Homo sapiens GN = FTO PE = 1 SV = 3 | 87 |
| RFC3 | Replication factor C subunit 3 OS = Homo sapiens GN = RFC3 PE = 1 SV = 2 | 84 |
| SMARCD1 | SWI/SNF-related matrix-associated actin-dependent regulator of chromatin subfamily D member 1 OS = Homo sapiens GN = SMARCD1 PE = 1 SV = 2 | 72 |
| MCM6 | DNA replication licensing factor MCM6 OS = Homo sapiens GN = MCM6 PE = 1 SV = 1 | 71 |
| GATAD2A | Transcriptional repressor p66-alpha OS = Homo sapiens GN = GATAD2A PE = 1 SV = 1 | 69 |

TABLE 1-continued

Top scored nuclear proteins found using our method:

| Gene Symbol | Description | Score Mascot |
| --- | --- | --- |
| IRF2BPL | Interferon regulatory factor 2-binding protein-like OS = Homo sapiens GN = IRF2BPL PE = 1 SV = 1 | 66 |
| GABPA | GA-binding protein alpha chain OS = Homo sapiens GN = GABPA PE = 1 SV = 1 | 66 |
| PUF60 | Poly(U)-binding-splicing factor PUF60 OS = Homo sapiens GN = PUF60 PE = 1 SV = 1 | 54 |
| DNTTIP1 | Deoxynucleotidyltransferase terminal-interacting protein 1 OS = Homo sapiens GN = DNTTIP1 PE = 1 SV = 2 | 52 |

Conditions of the experiment in Table 1: fixation: methanol fixation 12 hrs; lysis buffer: breast cancer lysis buffer: 100 mM Tris-HCl pH=7.5, 100 mM DTT, 4% SDS, 1× EDTA-free PIC; binding buffer: diluted lysis buffer with 1.6% SDS, 40 mM DTT 500 mM NaCl; beads: Pierce high capacity streptavidin agarose beads; elution: 1× sample buffer.

Practical Example 2. The system and the method can be used to identify proteins of stress granules in cells. First, stress granules are imaged by staining with a stress granule marker such as G3BP1. After imaging, image processing analysis is performed to generate a series of point coordinates to be scanned by the photosensitizing light source. We were able to develop an image processing algorithm that can detect locations of stress granules precisely for further proteomic studies as shown in FIGS. 4A and 4B.

Practical Example 3. The system and the method can be used to distinguish the difference of proteins in cancer cells that possess cancer stem cell markers (e.g., CD44) and those that do not. To distinguish the differences of cancer cells and cancer stem cells, the protocol is same as above embodiment 1, except that the stem cell marker is used for imaging.

Practical Example 4. The system and the method can be applied to live cells and model animals (in vivo). Live cell imaging or in vivo imaging instead of antibody staining is performed and photosensitizing illumination is performed based on images from live cells or animals.

The major advantage of this invention is the ability to perform high-content high-precision photo-induced processing guided by cell images. Thus, one can specifically process proteins, lipids, nucleic acids, or biochemical species in an area of interest based on user-defined subcellular features. The labeled proteins, lipids, or nucleic acids can also be purified and identified using mass spectrometry when proteomic analysis is of interest. The high-content and high-precision capability of this invention have not be achieved by prior similar techniques, so that it is currently the only available system to reach the speed and precision requirements needed for collecting enough biomolecular samples guided by imaging for proteomic studies or biomedical studies.

In one embodiment, this system can be used to perform photoablation or photobleaching. Photosensitizers can be used to generate reactive oxygen species (ROS). For example, Rose Bengal can be used to generate singlet oxygen, a kind of ROS. Singlet oxygen is highly reactive that can damage biomolecules in vivo to reach photobleaching or photoablation. This system can reach subcellular photoablation that cannot be reached before in numerous cells simultaneously during culture or even tissues and can be also applied to phototherapy.

In one embodiment, this system can be used to perform photoregulation. For example, a method called directed bioorthogonal ligand tethering (BOLT) has been used to achieve selective inhibition of protein functions, such as to control phosphorylation in vivo by modified kinase. The system and method provided by the aforementioned embodiments can be used to reach subcellular photoregulation with a large number of cells.

Some embodiments of the invention, a kind of system and method that complete the process of photosensitizing and processing biomolecules automatically, have the following advantages and effects.

First, some embodiments of the invention proposes a photo-labeling method that are superior to the chemical labeling method APEX because the system and/or the process illustrated by some embodiments of the invention can more precisely specify the labeling features instead of labeling all with only the affinity criterion. One can designate the target and use this system to distinguish and label different group of proteins in the same area. Thus, it has an advantage in finding the proteomics based on morphology or other features that APEX cannot achieve.

Second, the system and the method illustrated by some embodiments of the invention are superior to STOMP because this invention implements the high-content capability that STOMP cannot achieve due to its limited labeling speed. The speed of STOMP will be too slow for low abundant proteins, while this invention can extract enough samples for proteins that have low copy numbers in each cell within a short period of time such as several hours. The system illustrated by some embodiments of the invention has the speed and specificity advantages due to integrated image processing, stage scanning, and galvanometric scanner control.

Third, some embodiments of the invention have preferred reagents that can label many groups of proteins. Compare with chemical-labeling method such as miniSOG that only can label several groups of proteins; the system and the method illustrated by some embodiments of the invention can labels all the proteins in a specific area. Furthermore, they can be designed by software to label the area with a complicated shape.

In summary, the present disclosure provides a microscope-based system and method for image-guided microscopic illumination. The microscope-based system and method utilizes two independent processing modules (i.e., the first processing module and the second processing module) which simultaneously controls the imaging assembly for taking an image of a sample and the illuminating assembly for illuminating the sample. Moreover, the second processing module is in communication with the first processing module and receives the coordination of the targeted points on the sample (i.e., the "interested region" in the image of the sample and processed by the first processing module) so as to rapidly control the illuminating assembly to illuminate targeted points on the sample. Hence, the image-guided systems and methods of this disclosure enable a high-content process to illuminate varying patterns through a large number of fields of view consecutively.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A system for image-guided microscopic laser scanning of varying patterns on a sample through two or more fields of view of the sample, the system comprising at least one processing module configured to:
   control an imaging assembly to acquire a first image of a first field of view of the sample, the first field of view being a subset of the sample;
   process the first image automatically based on a predefined criterion, so as to determine coordinate information of a first region of interest in the first field of view;
   control an illuminating assembly to direct a laser beam at the first field of view following a first pattern corresponding to the coordinate information of the first region of interest in the first field of view; and
   control the imaging assembly to acquire a second image of a second field of view, the second field of view being a subset of the sample;
   determine coordinate information of a second region of interest in the second field of view automatically based on the predefined criterion; and
   control the illuminating assembly to direct a laser beam at the second field of view following a second pattern corresponding to coordinate information of the second region of interest in the second field of view,
   wherein the second pattern is different from the first pattern.

2. The system according to claim 1, wherein the illuminating assembly is adapted to induce a photo-activated reaction in the first region of interest and the second region of interest.

3. The system according to claim 1, wherein the first region of interest and the second region of interest each comprises a plurality of regions of interest.

4. The system according to claim 1, wherein the imaging assembly comprises a camera and an imaging light source.

5. The system according to claim 1, wherein the illuminating assembly comprises a laser light source and a pattern illumination device.

6. The system according to claim 1, wherein the microscope comprises an objective, the at least one processing module being further configured to control the objective to move among the first field of view and the second field of view, and wherein the at least one processing module is further configured to move a stage of a microscope among the first field of view and the second field of view.

7. The system according to claim 1, wherein the sample comprises live cells, the at least one processing module being configured to direct the laser beam at the live cells according to the coordinate information of the first region of interest in the first field of view and the second region of interest in the second field of view, and wherein the coordinate information of the first region of interest in first field of view is different from the coordinate information of the second region of interest in the second field of view.

8. The system according to claim 1, wherein the sample comprises fixed cells, the at least one processing module being configured to direct the laser beam at the fixed cells according to the coordinate information of the first region of interest in the first field of view and the coordinate information of the second region of interest in the second field of view, and wherein the coordinate information of the first region of interest in first field of view is different from the coordinate information of the second region of interest in the second field of view.

9. The system according to claim 1, wherein the predefined criterion comprises a morphology, intensity, contrast, or specific features of the sample.

10. The system according to claim 1, wherein the sample comprises a cell or a tissue sample.

11. The system according to claim 1, wherein the illuminating assembly is adapted to induce a photochemical reaction in the first region of interest and the second region of interest.

12. A method for image-guided microscopic laser scanning of varying patterns on a sample through two or more fields of view of the sample, comprising:

acquiring a first image of a first field of view, the first field of view being a subset of the sample;

based on a predefined criterion, processing the first image automatically to determine coordinate information of a first region of interest in the first field of view;

directing a laser beam at the first field of view following a first pattern corresponding to the coordinate information of the first region of interest in the first field of view;

acquiring a second image of a second field of view;

determining coordinate information of a second region of interest in the second field of view automatically based on the predefined criterion; and directing a laser beam at the second field of view following a second pattern corresponding to the coordinate information of the second region of interest in the second field of view;

wherein the second pattern is different from the first pattern.

13. The method according to claim 12, wherein the predefined criterion comprises a morphology, intensity, contrast, or specific features of the sample.

14. The method according to claim 12, wherein the sample comprise a cell or a tissue sample.

15. The method according to claim 12, wherein the sample is disposed on a stage of a microscope, the method further comprising controlling an objective of the microscope to move among the first field of view and the second field of view.

16. The method according to claim 12, wherein the sample comprises a live cell, wherein the method comprises directing the laser beam at the live cell according to the coordinate information of the first region of interest in the first field of view and the second region of interest in the second field of view, and wherein the coordinate information of the first region of interest in first field of view is different from the coordinate information of the second region of interest in the second field of view.

17. The method according to claim 12, wherein the sample comprises a fixed cell, wherein the method comprises directing the laser beam at the fixed cell according to the coordinate information of the first region of interest in the first field of view and the second region of interest in the second field of view, and wherein the coordinate information of the first region of interest in first field of view is different from the coordinate information of the second region of interest in the second field of view.

18. The method according to claim 12, wherein the first region of interest and the second region of interest each comprises a plurality of regions of interest.

19. The method according to claim 12, wherein directing the laser beam at the first field of view comprises inducing a photochemical reaction in the first region of interest, and wherein directing the laser beam at the second field of view comprises inducing a photochemical reaction in the second region of interest.

20. The method according to claim 12, wherein directing the laser beam at the first field of view comprises inducing a photo-activated reaction in the first region of interest, and wherein directing the laser beam at the second field of view comprises inducing a photo-activated reaction in the second region of interest.

* * * * *